US012791319B2

(12) United States Patent
Gupta et al.

(10) Patent No.: US 12,791,319 B2
(45) Date of Patent: Nov. 10, 2026

(54) CROWD-SOURCED ROAD GEOMETRY ESTIMATION AND APPLICATIONS THEREOF

(71) Applicant: The Research Foundation for The State University of New York, Amherst, NY (US)

(72) Inventors: Abhishek Gupta, Amherst, NY (US); Chunming Qiao, Amherst, NY (US); Lu Su, Amherst, NY (US); Sateesh Addepalli, Amherst, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 72 days.

(21) Appl. No.: 18/633,500

(22) Filed: Apr. 11, 2024

(65) Prior Publication Data

US 2025/0321104 A1 Oct. 16, 2025

(51) Int. Cl.
*G01C 21/16* (2006.01)
*B60W 40/06* (2012.01)
*G01C 25/00* (2006.01)

(52) U.S. Cl.
CPC ........... *G01C 21/165* (2013.01); *B60W 40/06* (2013.01); *G01C 25/005* (2013.01)

(58) Field of Classification Search
CPC ..... B60W 40/06; G01C 21/16; G01C 21/165; G01C 25/005
USPC .......................................................... 701/472
See application file for complete search history.

(56) References Cited

U.S. PATENT DOCUMENTS

| | | | | |
|---|---|---|---|---|
| 8,589,015 B2 * | 11/2013 | Willis | G01C 25/005 701/1 |
| 11,785,161 B1 * | 10/2023 | Suiter | H04N 1/212 348/231.4 |
| 11,884,278 B2 * | 1/2024 | Guan | B60W 30/18 |
| 2005/0125146 A1 * | 6/2005 | Phuyal | G06T 17/05 701/409 |

(Continued)

FOREIGN PATENT DOCUMENTS

| | | | | |
|---|---|---|---|---|
| AU | 2004201910 A1 * | 11/2004 | G01C 21/165 |
| CN | 113260544 A * | 8/2021 | B60W 30/10 |

(Continued)

OTHER PUBLICATIONS

Gupta, et al., "Road Grade Estimation Using Crowd-Sourced Smartphone Data," 2020 19th ACM/IEEE International Conference on Information Processing in Sensor Networks (IPSN), Sydney, NSW, Australia, 2020, pp. 313-324, doi: 10.1109/IPSN48710.2020.00-25 https://ieeexplore.ieee.org/document/9111051 (Year: 2020).*

*Primary Examiner* — Atul Trivedi
(74) *Attorney, Agent, or Firm* — Hodgson Russ LLP

(57) ABSTRACT

A method for collecting road geometry information includes obtaining gyroscope data from a gyroscope of a personal device fixed to a moving vehicle; aligning the gyroscope data with GPS data from a GPS module of the personal device to generate aligned data; matching the aligned data to a nearest road segment based on a preexisting map; determining a time of stable dynamics of the vehicle based on the map and the matched nearest road segment; and correcting a drift of a gyroscope using data from an accelerometer of the personal device during the determined time of stable dynamics.

21 Claims, 23 Drawing Sheets

(56) References Cited

U.S. PATENT DOCUMENTS

| | | | | |
|---|---|---|---|---|
| 2010/0312428 | A1* | 12/2010 | Roberge | A01B 69/007 717/106 |
| 2012/0174445 | A1* | 7/2012 | Jones | A01B 69/004 37/197 |
| 2017/0016728 | A1* | 1/2017 | Sheard | F41G 7/36 |
| 2019/0271550 | A1* | 9/2019 | Breed | B60N 2/00 |
| 2020/0003557 | A1* | 1/2020 | Gazza | G01C 21/3848 |
| 2020/0098185 | A1* | 3/2020 | Schradin | A47C 15/004 |
| 2020/0200537 | A1* | 6/2020 | Ceisel | E02F 3/841 |
| 2021/0096264 | A1* | 4/2021 | Bosse | B60W 30/10 |
| 2021/0207961 | A1* | 7/2021 | Saini | G01S 19/49 |
| 2021/0278210 | A1* | 9/2021 | Schleicher | G01C 9/08 |
| 2024/0288280 | A1* | 8/2024 | Daniluk | B65G 67/24 |
| 2025/0180356 | A1* | 6/2025 | Milo | H04W 4/029 |

FOREIGN PATENT DOCUMENTS

| | | | | | |
|---|---|---|---|---|---|
| CN | 118111471 | A | * | 5/2024 | G01C 21/18 |
| CN | 118387110 | A | * | 7/2024 | G07C 5/0866 |
| EP | 3874928 | A1 | * | 9/2021 | A01B 79/00 |
| EP | 3878256 | A1 | * | 9/2021 | A01B 79/00 |
| EP | 3878257 | A1 | * | 9/2021 | A01B 79/00 |
| EP | 3878258 | A1 | * | 9/2021 | A01B 79/00 |
| EP | 3879232 | A1 | * | 9/2021 | A01B 69/007 |
| GB | 2578868 | A | * | 6/2020 | G01P 21/00 |
| KR | 20220054179 | A | * | 5/2022 | G01C 21/3826 |
| TW | 201706570 | A | * | 2/2017 | |
| WO | WO-2018140482 | A1 | * | 8/2018 | G01C 9/06 |

* cited by examiner

CROWD-SOURCED ROAD GEOMETRY ESTIMATION AND APPLICATIONS THEREOF

STATEMENT REGARDING FEDERALLY SPONSORED RESEARCH

This invention was made with government support under contract no. 2044670 awarded by the National Science Foundation. The government has certain rights in the invention.

FIELD OF THE DISCLOSURE

The present disclosure relates to techniques for determining road geometry features and for road-geometry-aware vehicle control.

BACKGROUND OF THE DISCLOSURE

Current digital road maps suffer from incompleteness, in-accuracy, lack of fine-grained information and infrequent data updates. A major limitation of these digital maps is the non-availability of accurate and high-resolution information on road geometry features such as grade, elevation, transverse slope, and curvature at scale. This is reflected in the fact that most of the large-scale commercial maps that enable navigation on mobile devices such as from Google, Mapbox, Openstreet maps, etc. are 2D, i.e., they lack information on features such as grade, elevation and transverse slope. Moreover, the information on 2D geometry features i.e., the curvature of roads does not have adequate accuracy and resolution to be used for enhanced applications such as ADAS. Acquisition of road geometry features is predominantly done by either remote sensing techniques or ground-sensing surveys using instrumented vehicles or a combination of both. Remotely sensed data from satellite/aircraft surveys oftentimes suffer from low-resolution, accuracy and susceptibility to occlusions along with high cost. Data from ground surveys using instrumented vehicles, though having high accuracy and resolution, suffers from high cost and labor-intensive processes. Because of the above limitations with the state of the art, production of accurate, up-to-date and data rich digital road maps at scale has been a challenging task.

Ground Mapping

Roadway Asset tracking: Instrumented vehicle solutions, e.g., Automatic road analyzers from Fugro are used for road asset tracking and maintenance (FIG. 1). Along with road geometry, asset information such as location of sign boards, red-lights, guard-rails and road conditions (cracks, distresses, etc.) are also collected. Several state DOT's (e.g., North Carolina State DOT) have given contracts to such instrumented vehicle companies to gather this information. However, these methods suffer from high cost, limited scalability, limited coverage, low update frequency, where typically these surveys are conducted once every 3-4 years. Road networks on the other hand change at a much faster rate. According to the US Department of Transportation (USDOT), between 2000 and 2016, the U.S. built an average of 30,427 lane miles of roadway per year. For developing nations, this number is significantly higher.

HD/ADAS mapping: HD/ADAS maps are typically generated using data from instrumented vehicles (HERE, TomTom, Waymo, Cruise Automation, etc.) with high precision and costly sensors. ADAS maps include information on road geometry (grade, curvature), speed limits and lanes (location and 2D geometry) with several meters' accuracy. Use cases are to enable ADAS features such as predictive-powertrain systems, eco-routing and curve speed warning systems. HD maps are more accurate (cm level accuracy) and extensive and include precise location on the drivable area on the road, location of curbs, signposts and their type and red lights in addition to the information in ADAS maps. However, these methods suffer from high cost, limited scalability, limited coverage and low update frequency.

Using in-vehicle sensors: To alleviate high cost associated with traditional survey vehicles, several methods use in-vehicle sensors such as IMU's, magnetometer, wheel odometry, steering wheel sensor, torque sensors, camera, GPS, etc. to estimate road geometry features. Typically, these methods rely on sophisticated vehicle dynamics models and traditional sensor fusion techniques for the estimation of road geometry. In addition to the requirement of vehicle specific properties such as mass, frontal area, suspension properties, these methods are prone to errors from sub-optimal fusion. Typically, the above methods estimate road geometry features using information from a single run/trip on the target road network. This makes these methods prone to pollution/error in estimates typically due to sub-optimal fusion, where error prone estimations from one or more sensors can spoil the fused estimation. For e.g., estimation using the accelerometer as the primary sensor results in picking up of vehicle dynamics events in the estimation. This might result in inaccurate estimations due to distortion of the estimated road geometry during vehicle dynamics events such as acceleration, deceleration and turning.

To solve the above problem, some methods fuse information from multiple runs or trips to improve the reliability of the final estimations of road grade. These methods use the sensory data from each vehicle to obtain an estimate of the road geometry features using the above-mentioned traditional fusion/vehicle dynamics techniques and then (weight) averages the estimates to obtain the final results. This results in improved accuracy compared to the estimation derived from single runs. However, the generalizability of the above-mentioned approaches is questionable due to a) requirement of availability of the complete sensor suite on the vehicle/device b) requirement of access to in-vehicle sensors. The availability of all the required sensors in a vehicle/device is not guaranteed. E.g some sensing devices/vehicles might not be equipped with gyroscopes. Therefore, a complete array of sensors might not be at disposal on the device/vehicle for performing the fusion to estimate. Moreover, an auto-manufacturer can block access to some sensors of its vehicle for privacy reasons. Because of the above reasons, scaling the above methods to attain wide-scale sensing of road networks is difficult.

Finally, all the above methods rely on well calibrated, firmly mounted and high capability and high-quality sensors present in vehicles, which is not the case for generic sensing devices and therefore makes the direct adaptation of the above methods for such devices unfeasible.

Using mobile devices: Some existing methods use smartphones for estimating road geometry features. Traditional sensor fusion techniques such as a complementary filter is applied to fuse information from sensors present on commodity smartphones such as accelerometer, gyroscope and GPS. However, as mentioned above, such fusion produces sub-optimal results predominantly because of its inability to counter errors such as unpredictable nature of gyroscope drift and the high accelerometer noise in dynamic driving conditions, due to low-quality sensors. Moreover, for satisfactory performance these methods use sophisticated calibration methods requiring manual effort to account for the possibility of arbitrary orientation of the mobile device in the vehicle. Such manual involvement is undesirable as the user might not be trained or motivated to perform these calibration tasks.

Barometer based: Strava crowd-sources information from GPS and barometer equipped cycle computers (Garmin, Wajoo) and smartphones to map elevation profiles of roads and trails. However, the data sources are limited to only cyclists and runners, where only the roads that are bi-cycle accessible can be mapped using the above methods. Also, a small percentage of mobile devices (high end) have barometers thus imposing further constraint on data availability. Moreover, barometer-based methods can be used only to estimate road grade and not the estimation of other road geometry features such as curvature and transverse slope. Finally, the accuracy and resolution of grade data derived from barometer-based methods is not sufficient for ADAS/autonomous driving applications. Barometers are susceptible to errors due to factors such as weather changes, clogging of air vents and temperature variations. On the positive side, barometers are orientation agnostic and thus there is no need for determination of accurate orientation of the sensing device with respect to the carrier.

Manual surveys and construction design documents: Road design documents are an important source of information used by DOT's and even the mapping companies such as HERE. The data from these sources can become obsolete due to frequent changes in the road network.

Remote Sensing

Digital elevation models (DEM's) from sensor data from satellites, aerial surveys, ortho-imagery, e.g., SRTM (Resolution of 30 m×30 m with the coverage 80% of globe) National Elevation Dataset (Resolution of 10 m×10 m with coverage only in the USA). Google elevation API exposes the above data based on SRTM and NED. Google applies a smoothing/interpolation technique on the above SRTM and NED data and other data sources to derive their road elevation data. This makes the road elevation information more reliable, but still suffers from occlusions and poor performance on elevated road structures such as bridges (FIG. 2). High resolution remotely sensed imagery and elevation data are also available as a paid product. However, the coverage of high-resolution data needed for high accuracy grade estimation for ADAS/HD mapping applications is limited. High cost and low-update frequency: e.g., Maxar has the following data-suites: Resolution: 5 m, $30 per sq km to 50 cm: $145 per sq km. Moreover, these methods are susceptible to occlusions: e.g., not possible to map tunnels, roads covered with trees, forest, and mountain roads. Also, due to low resolution, it is not possible to estimate transverse slope features.

Remote+Ground Sensing

An example of such a mapping system is Toyota's TRI-AD, which uses information from vehicle's cameras, high resolution satellite imagery (from Maxar) and DEM's (Japan's NTT data) to create HD mapping tool. High accuracy mapping of the world's road network is a challenging large-scale sensing task and the current trend in the mapping is to reduce dependency on survey vehicles because of limited scalability and high cost. Crowd-sourced data from OEM's, dash cameras and custom devices is gaining popularity as a data source for providing updates to maps. However, these methods make use of the crowd-sourced data mainly providing updates on visual road features such as lane-markings, traffic signs, road closures, etc. and still rely on data from survey vehicles for road geometry attributes due to accuracy requirements. Another example is the road elevation data by Google for cycling and walking routes which is generated using information from DEM's+Google Street view (vehicles). Also, Google rolled out an eco-routing feature for maps app, where road grade calculated using the above road elevation information is used as an input to identify energy-efficient routes. However, dependence on high resolution satellite imagery, survey vehicles and other data sources limits the scalability and coverage of these approaches.

BRIEF SUMMARY OF THE DISCLOSURE

Some embodiments of the present disclosure fill this gap by utilizing crowd-sourced data from generic sensing devices to estimate road geometry features at scale and in an automated manner. The present methods can estimate high resolution information on road geometry features in a cost-efficient and scalable manner with accuracy comparable to that of state-of-the art instrumented survey vehicles.

A scalable and cost-efficient technology to obtain accurate information on road geometry data is important in providing accurate and reliable localization services (by supplementing the existing GPS and cellular/Wi-Fi based methods using signatures from road geometry) and enhanced navigational services. These services can benefit millions of travelers by improving (1) Mobility: For example, bicyclists or people on wheelchairs can benefit from the information on the road elevation, super elevation and curvature to select routes: navigation applications can suggest energy efficient routes in addition to the shortest using information on grade and elevation: (2) Road safety while reducing fuel consumption and harmful emission: by enabling optimized vehicle control including steering, speed and suspension/stability control. This is especially true for the current ADAS and future ADS: (3) Navigation in complex environments: where GPS and other cellular/Wi-Fi signal-based approaches are ineffective, e.g., stack interchanges (overlapped highways and bridges) or dense urban areas.

Embodiments of the presently-disclosed technology have the following unique competitive advantages over the state-of-the-art: (1) Uses generic devices based crowd-sensing and thus is low-cost and scalable, as opposed to the use of dedicated probe vehicles: (2) Transparent to smartphone owners, that is, it does not require any manual operation or inputs (as opposed to other generic sensing devices based solutions): (3) Performs heterogeneous sensor fusion leveraging data from multiple types of sensors on generic sensor devices, and thus can achieve a high accuracy compared to remote sensing approaches and the other generic sensing device based approaches. (4) Aggregate multiple user's sensing device data in a Quality of Information (QoI) aware manner to address the unreliability of individual device's sensors.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

In a first aspect, the present disclosure may be embodied as a method 100 for collecting road geometry information. The method 100 includes obtaining 103 gyroscope data from a gyroscope of a personal device fixed to a moving vehicle. The personal device may be, for example, a smartphone, a tablet, a laptop computer, a portable vehicle telematics device; or other device having one or more of a gyroscope, an accelerometer, and/or a GPS. The personal device is equipped with sensors including a gyroscope, an accelerometer, and a global positioning system (GPS) module. The personal device is fixed to a moving vehicle, such as, for example, an automobile, a truck, a motorcycle, a bicycle, etc. By "fixed," it is intended that the personal device is in a fixed position relative to the vehicle—the personal device need not be attached to the vehicle. For example, the personal device may be placed on a dashboard of the vehicle, in a center console of the vehicle, on a seat of the vehicle, attached to an interior portion of the vehicle, attached to an exterior portion of the vehicle, etc.

The sensors in such devices are typically characterized as follows:

- GPS: Low sampling rate/resolution and error prone in challenging/occluded environments.
- Gyroscope: Drifts that can be dynamic due to low quality sensors. Specific to generic sensing devices, the drifts can be erratic due to dynamic factors such as road conditions, mounting quality, temperature due to low-quality sensors.
- Accelerometer: Characterized by high noise due to low-quality as compared to its professional counterparts. Specific to our use-case, in-accuracy in smartphone-vehicle coordinate alignment results in biases. Another factor is pollution from vehicle dynamic events such as acceleration, braking and turning. Even slight change in relative orientation of a smartphone (e.g., due to small movements in the mount) can result in large errors in geometry estimation.

Other smartphone sensors, such as magnetometers, barometers, etc., can be used in addition to the above to improve estimation accuracy and reliability. But in the example embodiment, the system was constrained to the above three sensors due to (a) better availability and coverage=>only a small % of smartphones have barometers: (b) to avoid user involvement and make the system transparent to the user. To improve accuracy, the above sensors may be calibrated, which may involve manual steps to be done prior to use.

Figure 1:
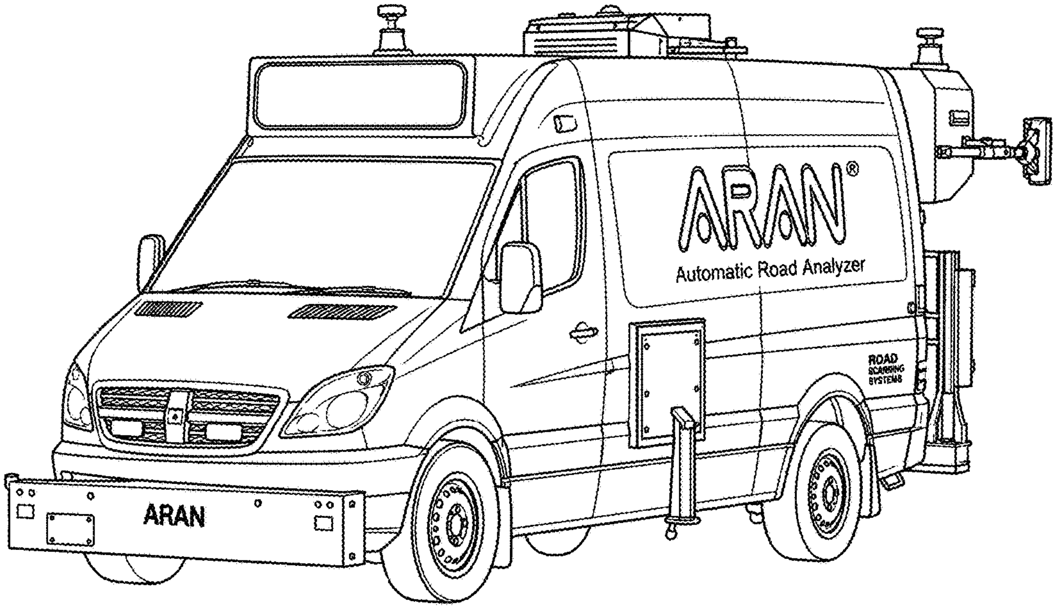
FIG. 1: Fugro's Automatic Road Analyzer.
Figure 2:
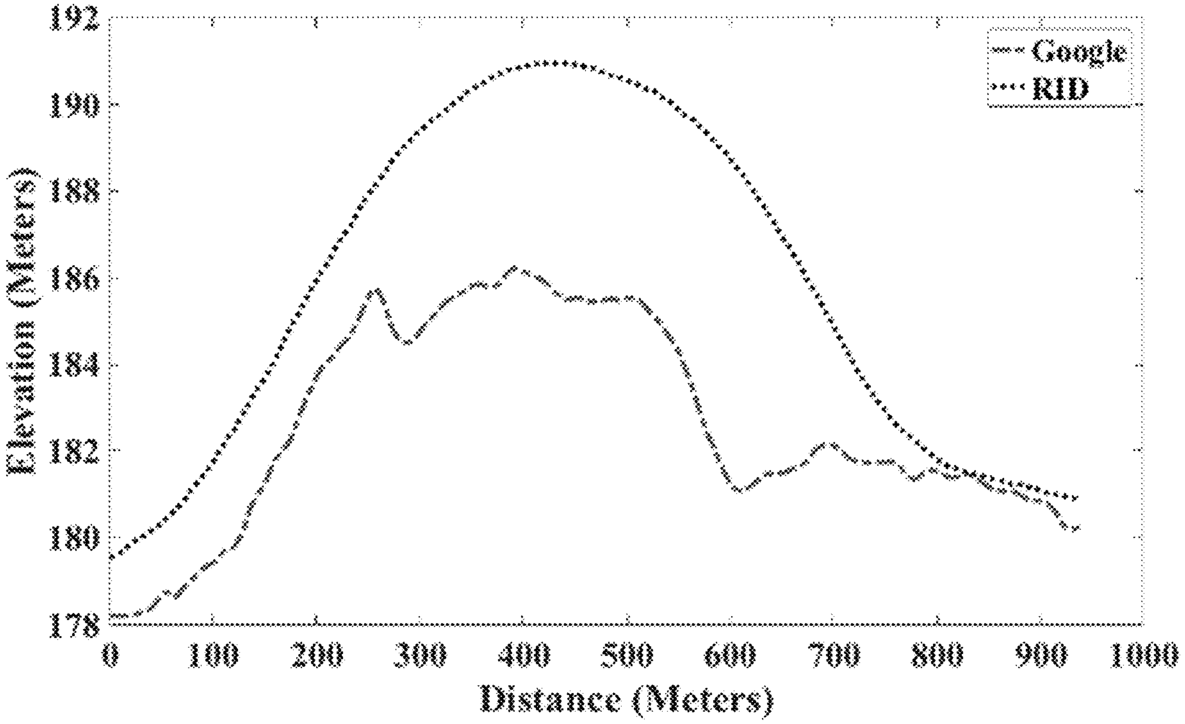
FIG. 2: Low accuracy and resolution of remote sensing data. The profiled road segment is a bridge. RID is elevation data from an instrumented vehicle.
Figure 3:
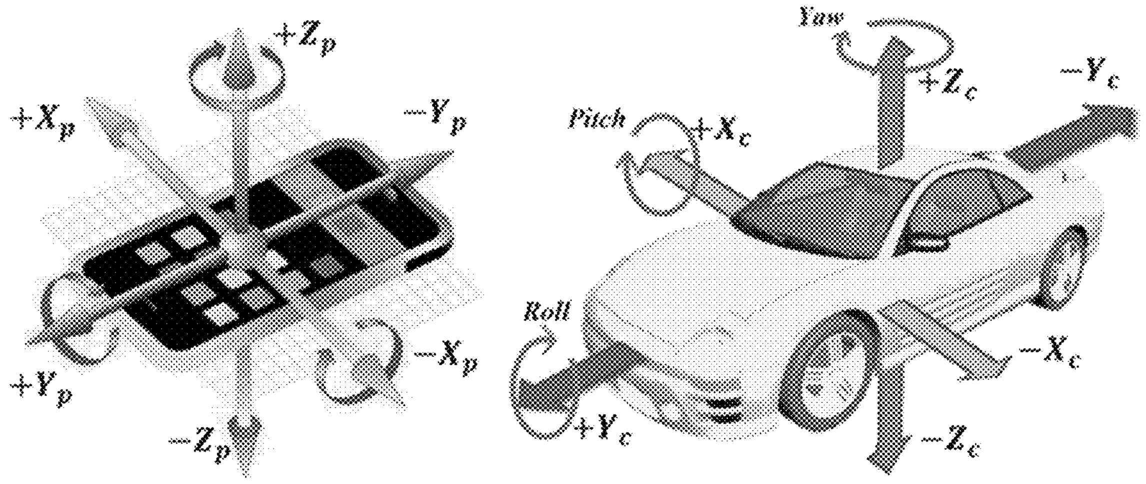
FIG. 3: Smartphone and Vehicle coordinate systems.
Figure 4:
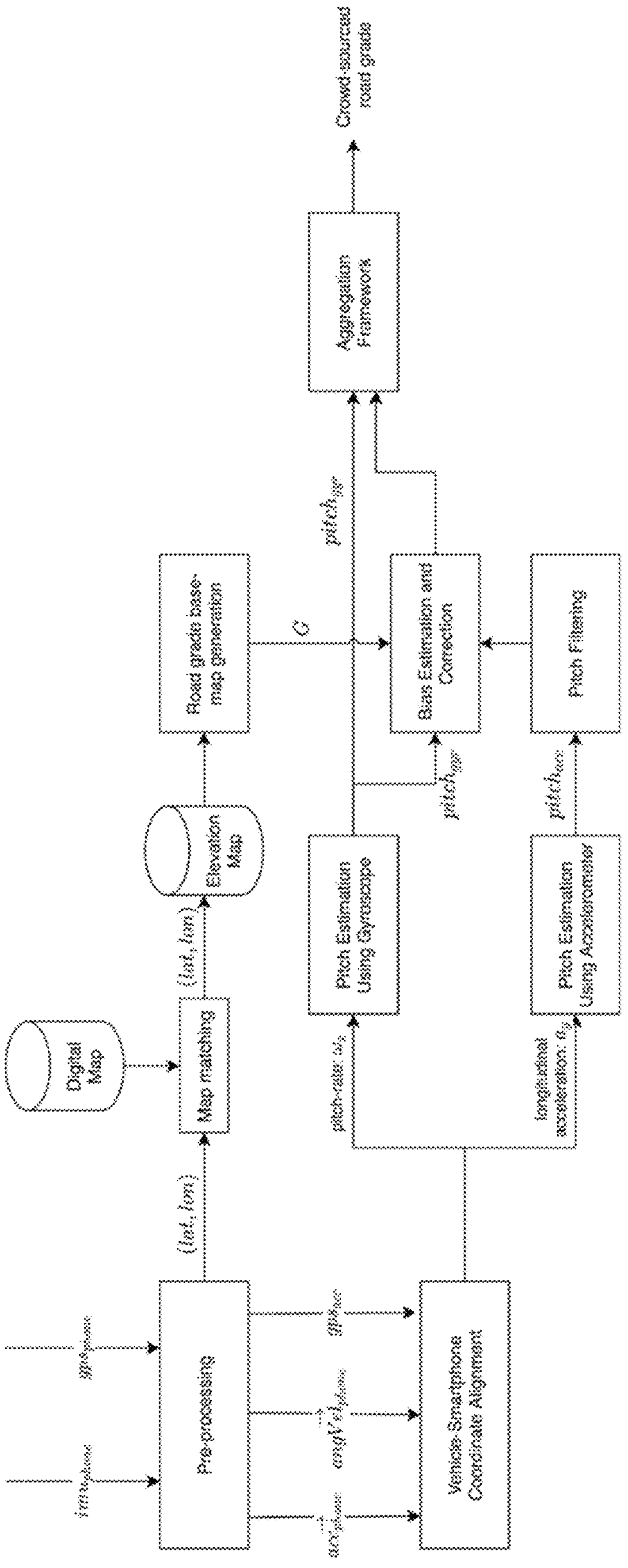
FIG. 4: Road grade estimation framework.

FIG. 4 illustrates an example architecture for an embodiment of a system for road grade estimation. Raw data from a smartphone is pre-processed in the "Pre-Processing" module. Here the data from the IMU is filtered, smoothed, and interpolated to get clean samples at uniform intervals. Also, the IMU traces are aligned with the GPS traces using peak matching based trace alignment.

The gyroscope data is aligned 106 with GPS data from the GPS module of the personal device. In this way, aligned data is generated. Also, the IMU traces are aligned with the GPS traces using peak matching based trace alignment.

Figure 5:
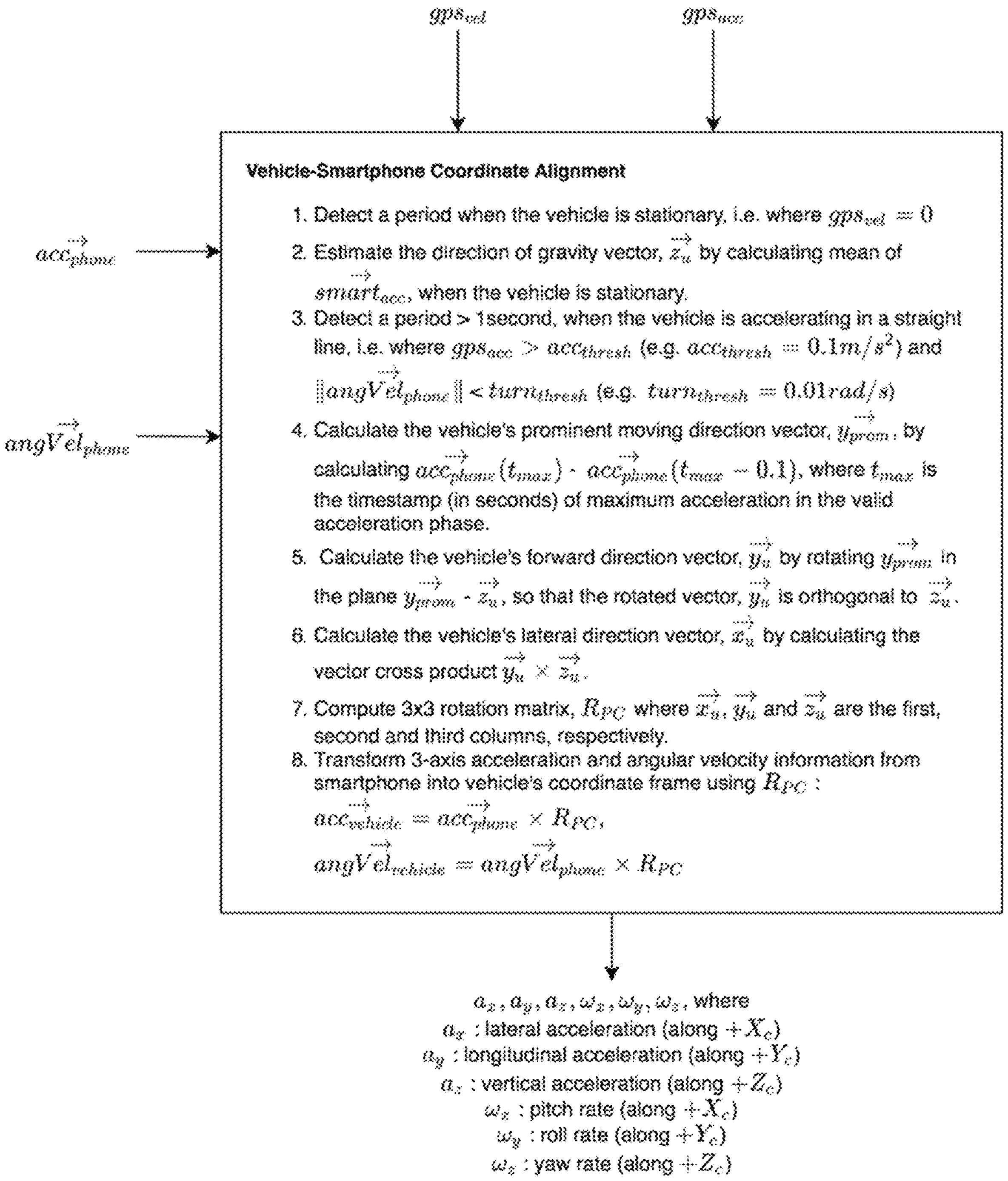
FIG. 5: Smartphone-Vehicle coordinate Alignment.

The method 100 may further include translating 118 the aligned data from a personal device coordinate system to a vehicle coordinate system. In some embodiments, the processed IMU and GPS data is passed through the "Vehicle-Smartphone Coordinate Alignment" module (shown in FIG. 5), where the IMU data is transformed from the smartphone coordinate system to the vehicle's coordinate system. Alignment may also be useful even where sensors are in known, fixed orientations within vehicles due to biases that can arise from factors such as mounting errors, chassis misalignment, tire pressure variations, suspension defects, etc.

The aligned data is matched 109 to a nearest road segment based on a preexisting map. The map may be obtained from various online map services or may be stored locally for offline use.

The method includes determining 112 a time of stable dynamics of the vehicle based on the map and the matched nearest road segment. A drift of a gyroscope is corrected 115 using data from an accelerometer of the personal device during the determined time of stable dynamics.

Road Grade Information (Pitch)

As stated above, in the example embodiment of FIG. 4, raw data from the smartphone is pre-processed in the "Pre-Processing" module. The raw GPS coordinates from the sensing device are map-matched to the nearest road segment.

A time of stable dynamics may be determined according to a gyroscopic drift to be corrected. For example, where pitch drift is to be corrected, the time of stable dynamics may be determined such that a pitch of the vehicle is stable. In some embodiments, the map-matched coordinates are queried against an elevation database such as Google Elevation to sample the corresponding elevation profile for the road segment. Estimates of vehicle's pitch are computed using calibrated/aligned data from gyroscope and accelerometer "Pitch Estimation Using Gyroscope" and "Pitch Estimation Using Accelerometer" modules, respectively (further described below). The "Pitch Filtering" module opportunistically selects pitch estimation from the accelerometer during stable driving phases to handle error prone estimations from accelerometer due to unstable vehicle dynamics.

Figure 6:
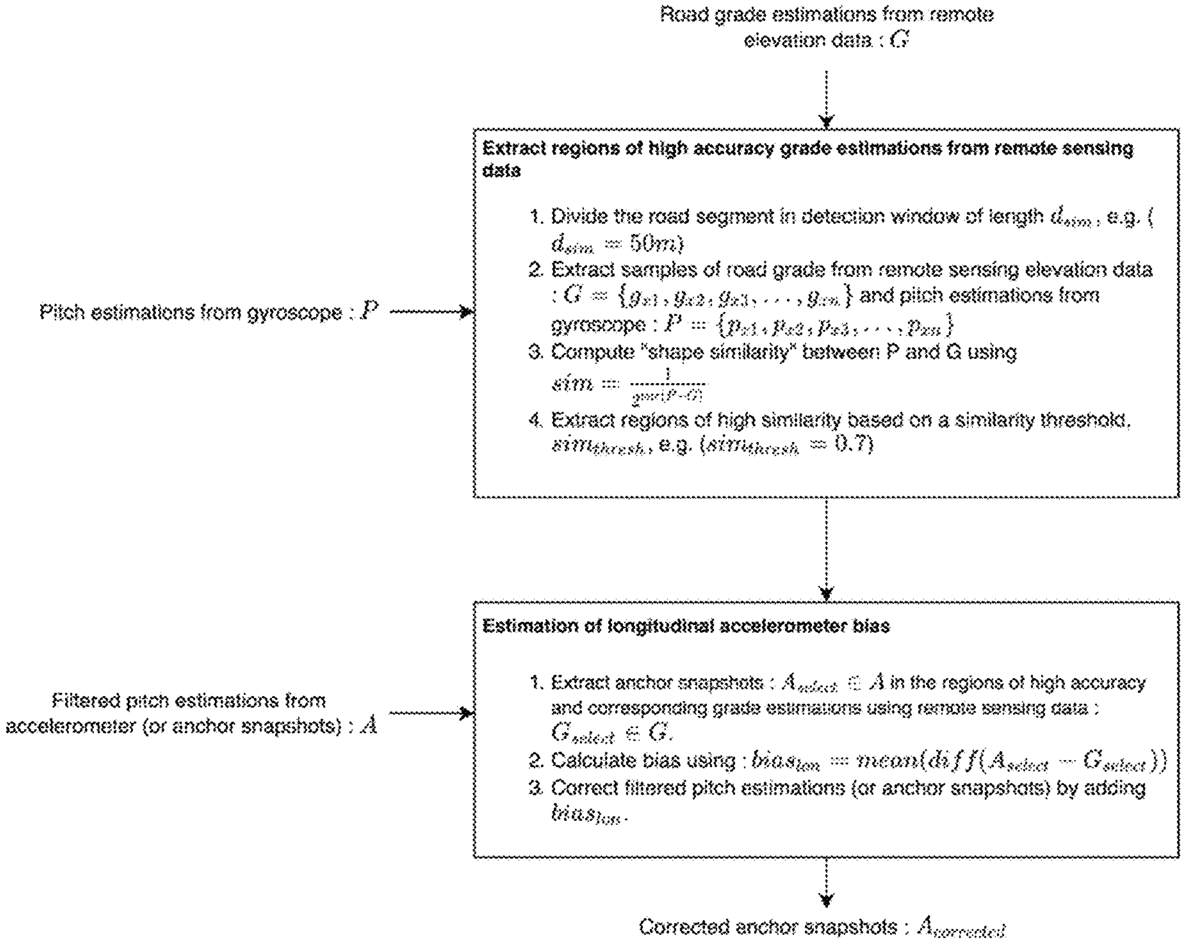
FIG. 6: Road grade Bias Estimation and Correction.

The bias associated with the computed anchor snapshots may be estimated by leveraging elevation data (for example, Google elevation data) and pitch estimations from the gyroscope (see, for example, the "Bias Estimation and Correction" module depicted in FIG. 6). For example, a "shape similarity" may be used to measure and extract regions where road grade estimations using remotely sensed elevation data is high. Remotely sensed elevation data due to its low resolution (e.g., SRTM's resolution is 30 m×30 m) results in poor accuracy of road grade estimation in areas (a) that are occluded—e.g., tunnels, forest roads, mountain roads and dense urban areas; and (b) where the road does not follow the profile of the surrounding terrain e.g., bridges, ramps, etc. To improve reliability and accuracy of bias estimation, remotely sensed data may be used in selected regions having high accuracy grade estimations. These regions are selected based on "shape similarity" measures between road grade estimations from remotely sensed elevation data and pitch estimations from gyroscopes as described herein.

Figure 7:
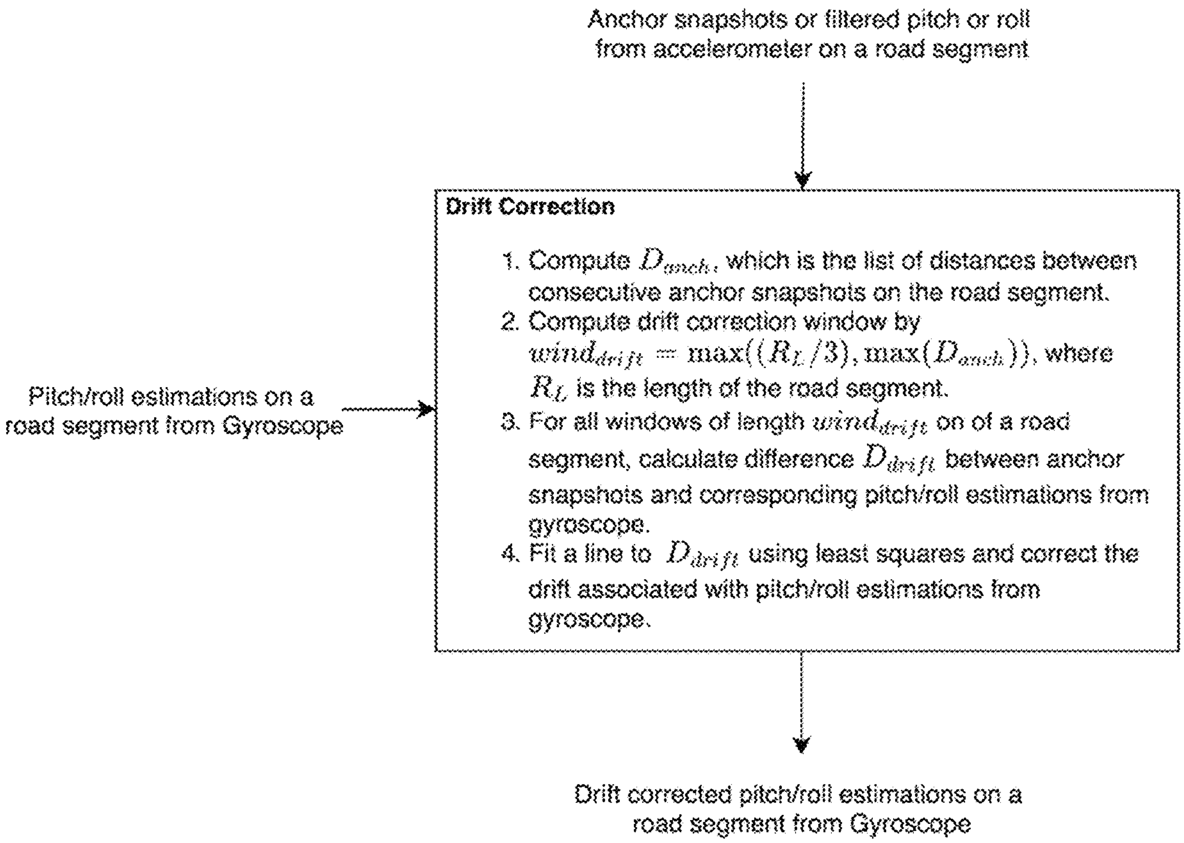
FIG. 7: Drift Correction.
Figure 8:
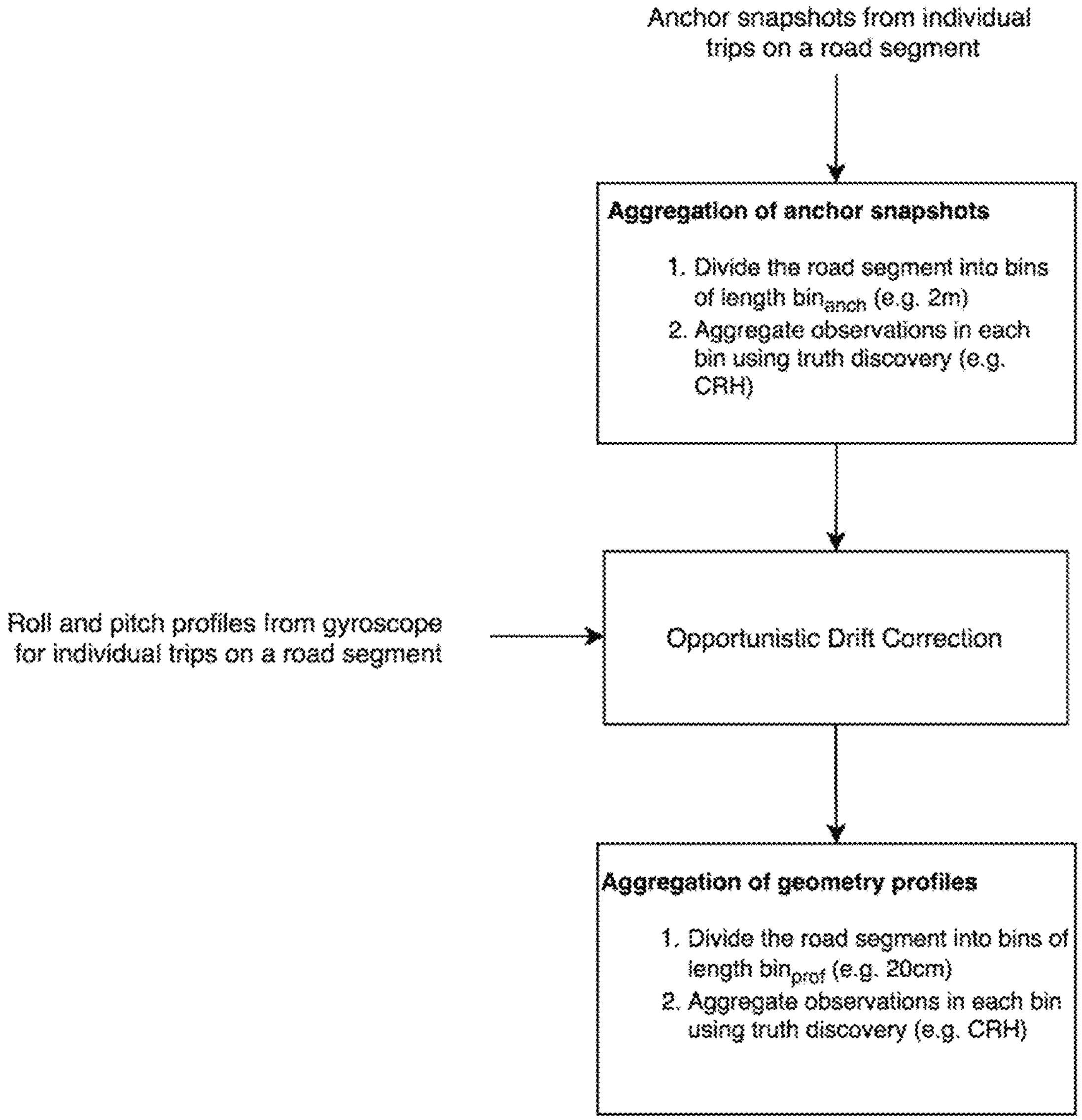
FIG. 8: Aggregation Framework.

In some embodiments, the corrected gyroscope drift (e.g., filtered pitch from accelerometer and pitch estimations) from individual trips are aggregated. For example, in some embodiments, the road segment grade profiles are aggregated. In the example "Aggregation Framework" module depicted in FIG. 8, an "Anchor Snapshots Aggregation" module aggregates anchor snapshots from different vehicles/sources on a road segment. The aggregated snapshots may then be fused with gyroscope data (e.g., pitch data) in a "Drift Correction" module (shown in FIG. 7), to generate drift compensated grade profiles of a road segment.

These drift compensated grade profiles may then be aggregated in the "Profile Aggregation" module to estimate a single road grade profile of a road segment. In more detail, to account for varying quality of data from different vehicles or participants, a quality-aware data aggregation may be performed. This varying quality of data can originate from factors such as carrying quality of sensors on different sensing devices, varying mounting stability of the sensing devices on different vehicles, varying physical properties of the vehicles such as suspension properties. Crowd-sourcing or aggregation of road geometry may be done in two steps:

First, the filtered estimations from the accelerometer (or anchor snapshots) from k trips are aggregated, where k is the number of drives (trips) through a road segment. Aggregation may be done using the Conflict Resolution on Heterogeneous Data (CRH) framework, a truth discovery framework. This provides a sparse and discontinuous road geometry profile of a road segment. These aggregated estimations from the accelerometer on a road segment are used to correct the drift associated with the estimations from the gyroscope of different trips on a road segment. This provides k continuous road geometry profiles of a road segment.

Second, the above k continuous profiles are aggregated using the CRH framework to get a single continuous geometry profile of a road segment.

An advantage of this above approach is decoupling the estimations of road geometry from accelerometer and gyroscope and aggregating them separately. An alternate way to aggregate information and as done by previous methods would be to aggregate the fused estimations from individual runs/trips. An issue with this alternative approach is that the errors from individual trips (e.g., caused by sub-optimal fusion) will propagate to the final estimated results. Additionally, in the first approach, the opportunistic estimations from the accelerometer can be sparse, the accuracy of which is directly dependent on the quality of information from GPS, which varies from location to location. The combined sparsity and error prone estimations from accelerometers can result in suboptimal drift correction of the estimations from gyroscope for an individual trip, the errors due to which might propagate in the final estimated result.

To avoid the above problem, the estimations from the accelerometer from different trips is aggregated first to solve the sparsity issue. Also, this aggregation results in removal of anomalous data points. The above two-step aggregation results in improved accuracy in geometry estimations. Also, the presently disclosed method reduces the amount of data (or number of trips) required to achieve desired accuracy in the estimation of road geometry.

Moreover, the participants in a crowd-sensing setup might have varying sensing capabilities. This variation can be in the form of availability of sensors, quality of sensors, or both—e.g., some sensing devices/vehicles might not be equipped with gyroscopes. Similarly, an auto-manufacturer can block access to some sensors of its vehicle for privacy reasons—e.g., accelerometer. Therefore, a complete array of sensors might not be at disposal on the device/vehicle for reliable sensing. The above-mentioned de-coupling reduces or eliminates the need for each vehicle to include all the sensors (accelerometer, gyroscope, and GPS). This allows for an increase in the scope of sensing devices (and increase coverage) that can be used by the participants to perform a sensing task, where fusion can be performed using a wide variety of sensing devices/vehicles with different capabilities. Moreover, this can reduce the compute, energy, and data transfer resources needed by a device to query and send sensor information to a server by sampling data as per need basis. For example, a participant's device can be asked to query only the GPS and accelerometer information for a particular road segment if there are already sufficient gyroscope traces available from other participants on that road segment.

Using remote sensing elevation data and road design principles to estimate accelerometer bias: Estimating road geometry using only accelerometer, GPS, and gyroscope alone is non-trivial due to the possibility of arbitrary placement of the smartphone inside the vehicle. This is because one cannot guarantee 100% accurate coordinate alignment due to the possibility of error due to tilt of the road on which coordinate alignment is performed. The previous methods solve this problem by using firmly mounted and well calibrated sensors or by either introducing an additional manual calibration step or fixing the device in a known orientation inside the vehicle. Embodiments of the present disclosure may use the following auxiliary information to automatically calibrate/estimate the bias associated with the accelerometer of the sensing device:

Remotely sensed elevation data to correct bias associated with road grade estimations: selecting road sections of high accuracy estimates of road grade from remotely sensed data based on the "shape similarity" between estimations from a method of the present disclosure and those derived using remotely sensed data. In an example embodiment, Google elevation data was used because of its large coverage and easy accessibility through an API. Google elevation data can be replaced with any other source of elevation information based on availability. Elevation data with higher accuracy and resolution is advantageously improves the ability to estimate the biases from smartphone sensors. Similarly, based on availability, information from a barometer can be used as an alternative or as an auxiliary sensor in our bias/offset estimation framework.

Road design principles to correct bias associated with transverse slope estimations: an optimization framework (linear program) was formulated that uses information from design principles of transverse slope on straight roads (or cross slope) and horizontal curves (or superelevation) on the route as constraints. The optimization framework outputs the offset/bias in the estimation of transverse slope.

As mentioned above, without the information from an auxiliary source it is non-trivial to account for the accelerometer's biases due to error in coordinate alignment. To estimate road grade bias, some embodiments of the present disclosure use readily available Google Elevation data. However, no readily available auxiliary data source exists that can be used to estimate lateral accelerometer bias. Note that Google elevation data cannot be used to estimate the transverse slope of the road because of its low resolution. Typical lane width is around 3 meters and therefore to achieve reasonable estimation of transverse slope a sub-meter resolution elevation data with very high accuracy will be needed. Therefore, typically, transverse slope information is estimated using survey vehicles using Lidars.

Road Transverse Slope (Roll)

Figure 9:
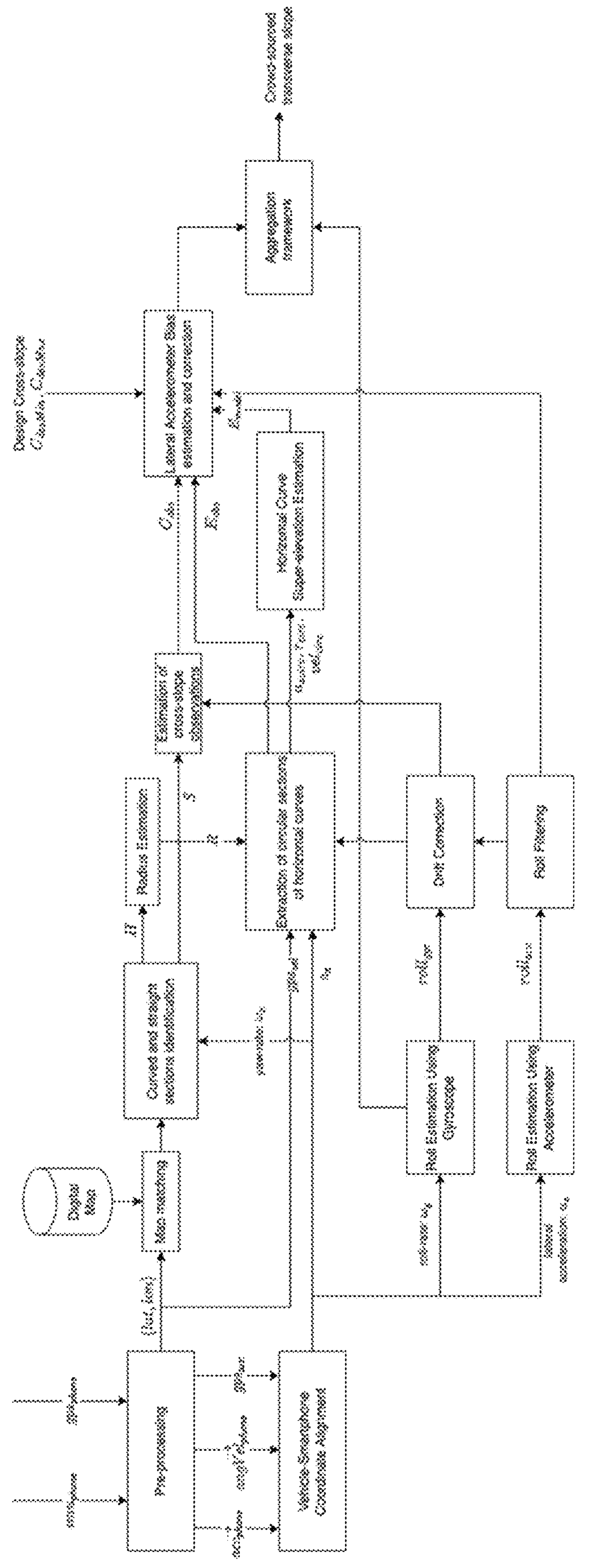
FIG. 9: Road transverse slope estimation framework.
Figure 10:
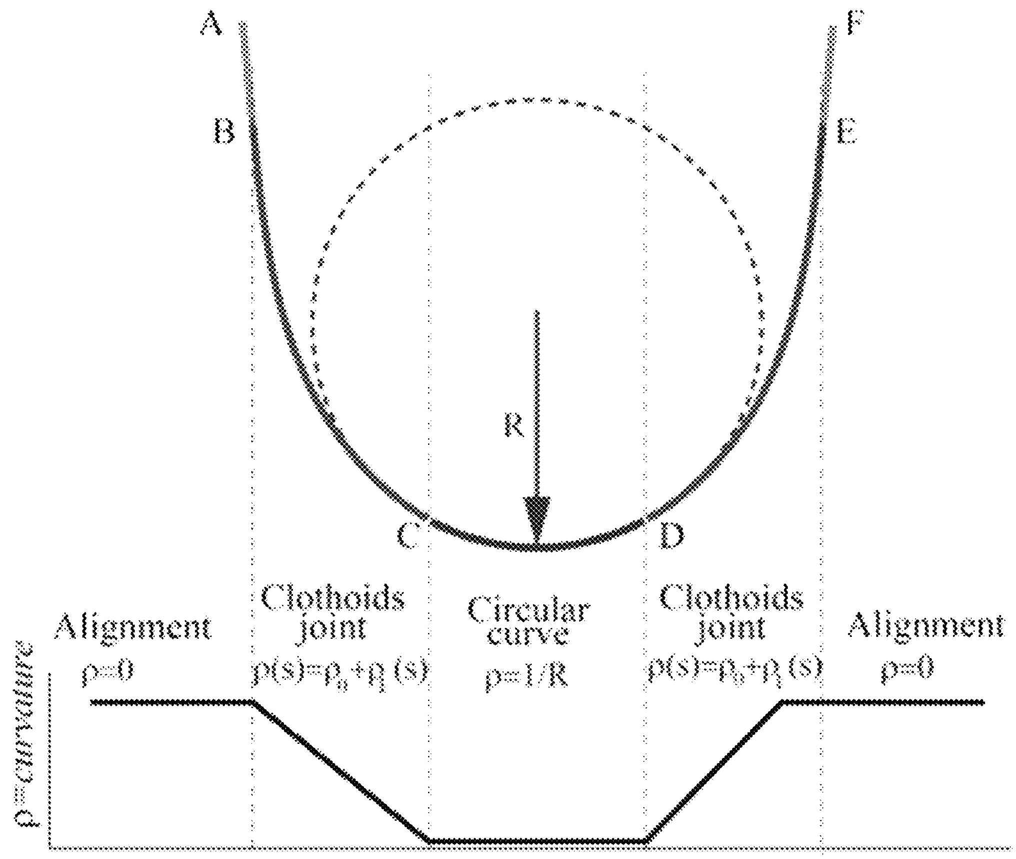
FIG. 10: Horizontal curve design.

In some embodiments, the transverse slope of the road segment is determined. FIG. 9 illustrates the architecture of a presently disclosed system for road transverse slope profile estimation. The system differs with the road grade estimation framework in the estimation of the (lateral) accelerometer/transverse slope bias. As mentioned above, remote sensing data's resolution is not sufficient to act as auxiliary information source for reliable estimation of the (lateral) accelerometer bias. Therefore, the method leverages constraints imposed by road design and estimations of superelevation on the horizontal curves using a vehicle kinematics model to estimate the transverse slope bias. The pipeline for the estimation of this bias is described below.

Figure 11:
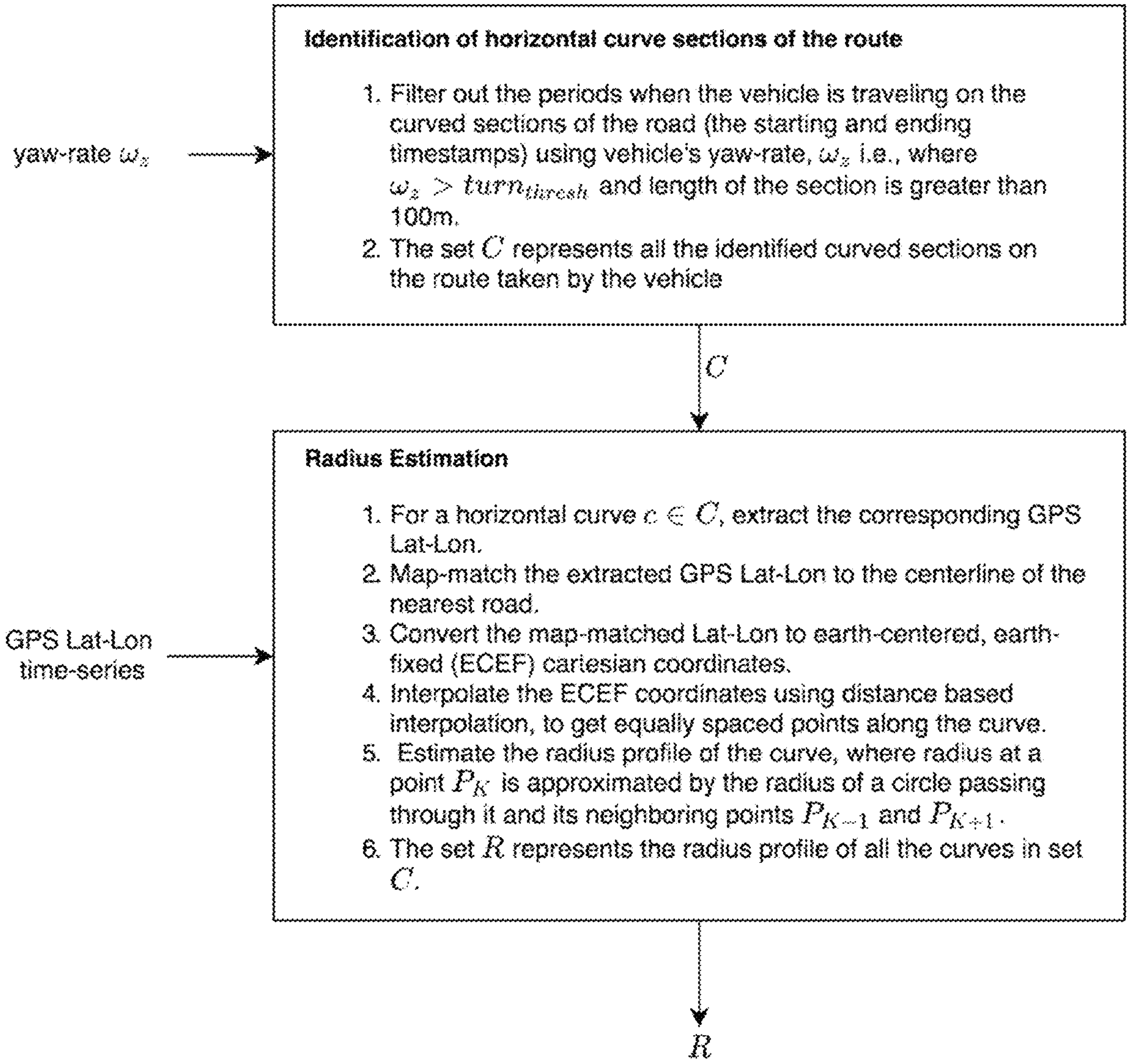
FIG. 11: Horizontal curve identification and radius estimation.
Figure 12:
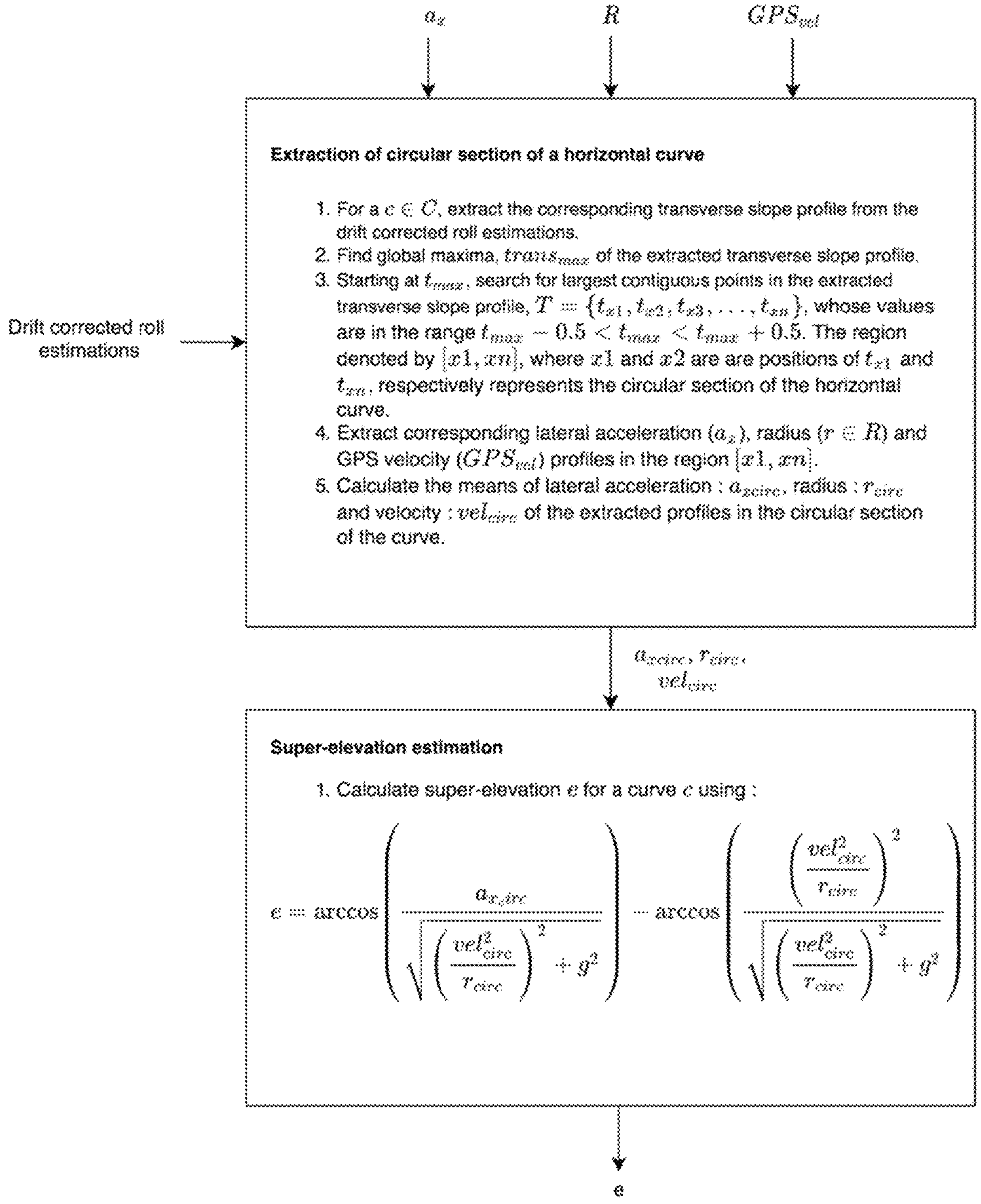
FIG. 12: Extraction of circular sections of horizontal curves and super-elevation estimation.

With reference to FIG. 9, first, curved (H) sections of the road are segregated from straight sections(S) of the road using the yaw-rate signal from the sensing device in the "Curved and straight sections identification" module (discussed below and detailed in FIG. 11). The "Radius Estimation" module estimates the radius profiles for the identified curved sections of the roads using the GPS coordinates (detailed in FIG. 11). Next, the "Extraction of circular sections of horizontal curves" snips out the lateral acceleration, radius and velocity information corresponding to the circular section of the horizontal curve using the drift corrected roll is used as an input (see FIG. 12).

Figure 13:
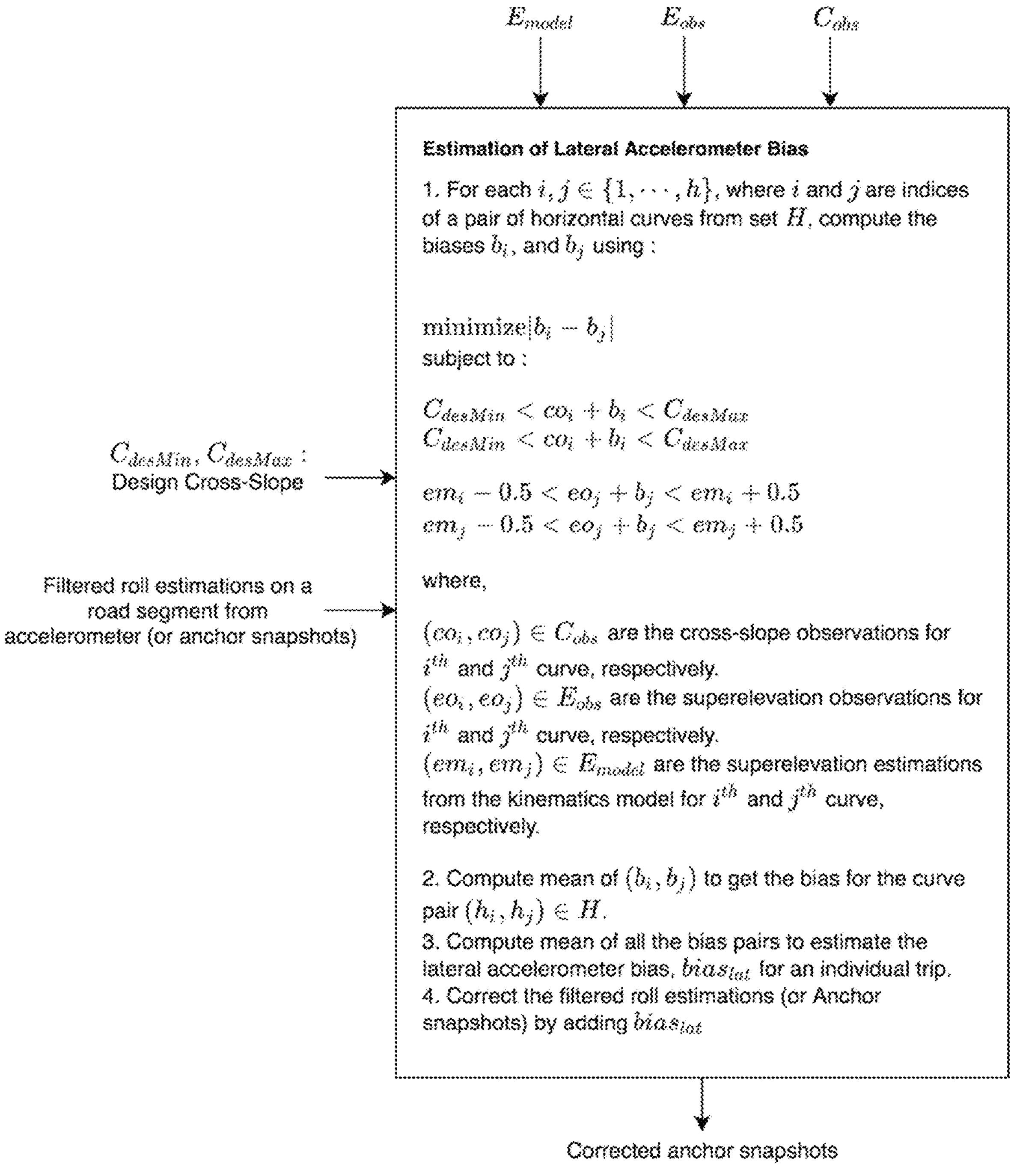
FIG. 13: Estimation of lateral accelerometer bias.
Figure 14:
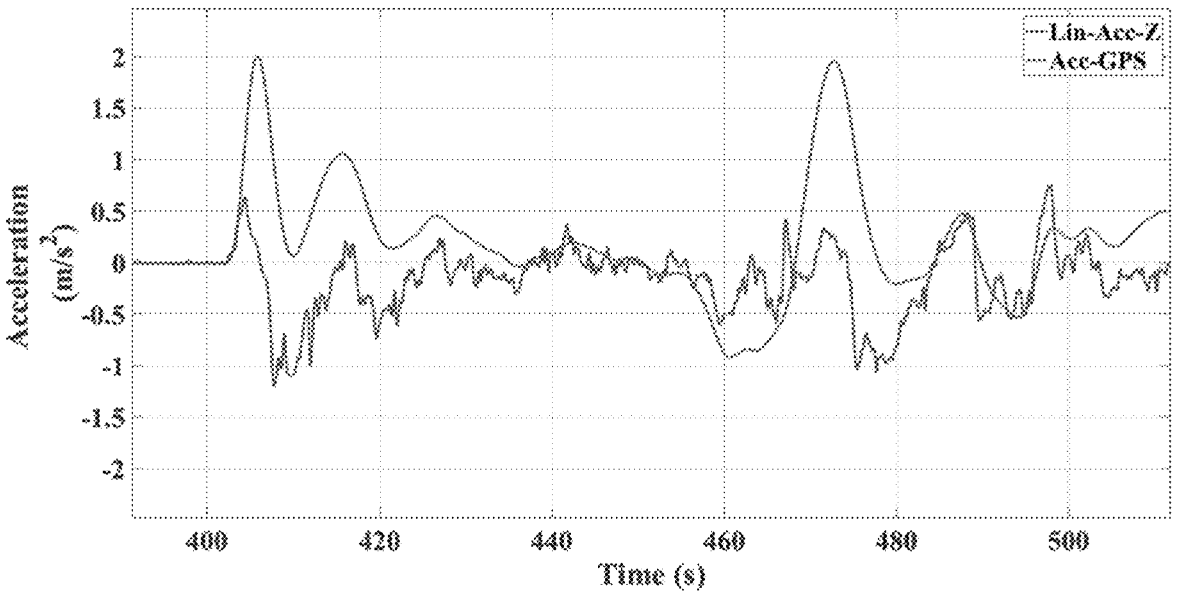
FIG. 14: Sub-optimal estimation of vehicle's forward acceleration by Android's framework.
Figure 15:
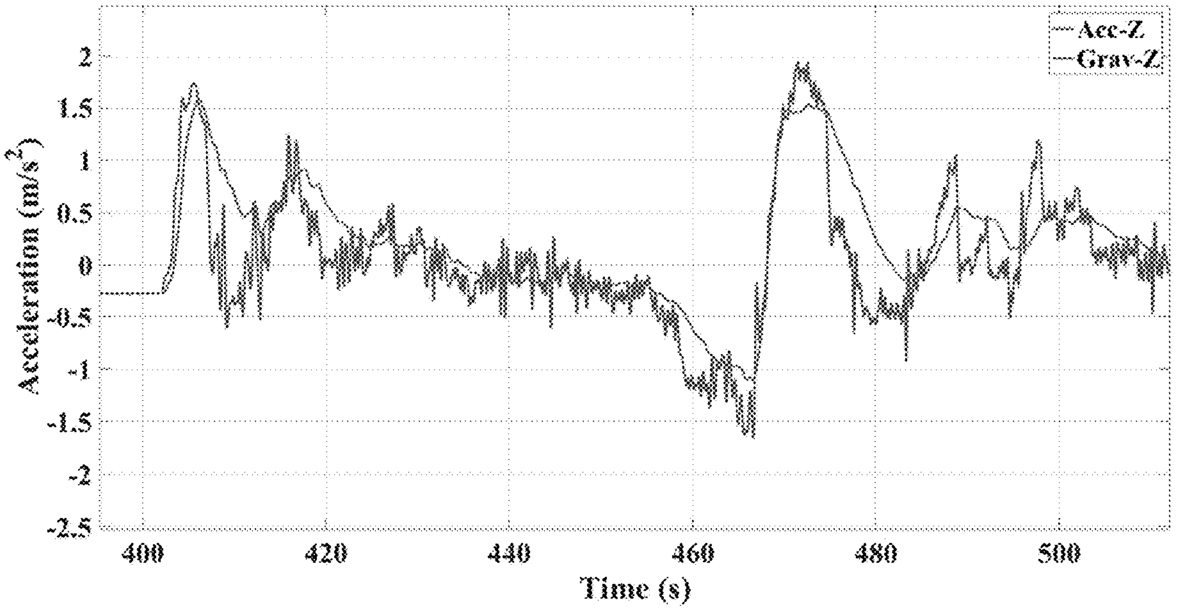
FIG. 15: Cross-talk between the acceleration and the estimation of gravity by Android's framework.

Also, observations on superelevation ($E_{obs}$) are estimated using the drift corrected roll in this module. Similarly, observations on cross-slope ($C_{obs}$) on the straight sections of the road are estimated using the drift corrected roll in the "Estimation of Cross slope estimation" module. The sensor information corresponding to circular sections is fed to the "Horizontal Curve Superelevation estimation" module that leverages a vehicle kinematics model to estimate the superelevation ($E_{model}$) of the horizontal curves on the route (H) (detailed in FIG. 12). These estimates of superelevation ($E_{model}$) along with observations on superelevation ($E_{obs}$), cross-slope ($C_{obs}$) and design cross-slope for roads ($C_{desMin}$, $C_{desMax}$) are used to correct the bias/offset associated with the filtered roll in the "Lateral Accelerometer Bias Estimation and Correction" module (FIG. 13). An optimization framework was designed to estimate the bias and leverage road design principles as hard constraints in the framework, as follows:

Superelevation on a horizontal curve: Superelevation observed using vehicle kinematics model that takes into input the radius of curvature of the curve, lateral acceleration (reported by accelerometer) and vehicle speed used in the framework as a constraint in the optimization framework. An alternative method (also tested) would be to estimate superelevation using a horizontal curve design model (used by civil engineers) that accounts for the type of road (highway, arterial), radius of curvature and design speed of the road to output the design superelevation.

Road cross slope or transverse slope on straight road segments: To account for the above noisy superelevation estimations, design cross-slope values may be leveraged as a hard constraint. A typical value of cross-slope is between 0.8-1.2 degrees. This can be used as a hard constraint in the optimization framework.

Offline Method of Estimating Vehicle State

In another aspect, the present disclosure provides an offline method for estimation of vehicle states that combines information from device's accelerometer, gyroscope, and GPS to estimate vehicle's longitudinal and lateral acceleration and longitudinal and lateral velocity. For example, the present embodiment may provide a method that compensates the effect of varying road geometry and accelerometer bias by estimating the combined signal encapsulating vehicles orientation changes due to road geometry and the accelerometer bias by performing opportunistic fusion on the data from device's accelerometer, gyroscope and GPS. In contrast to the existing methods that use traditional sensor fusion methods which are prone to errors due to high and unpredictable noise of low-cost sensors, our method performs fusion intelligently by treating gyroscope as the primary sensor and where the opportunistically chosen information from the accelerometer is used only to correct the drift of the gyroscope.

Figure 16:
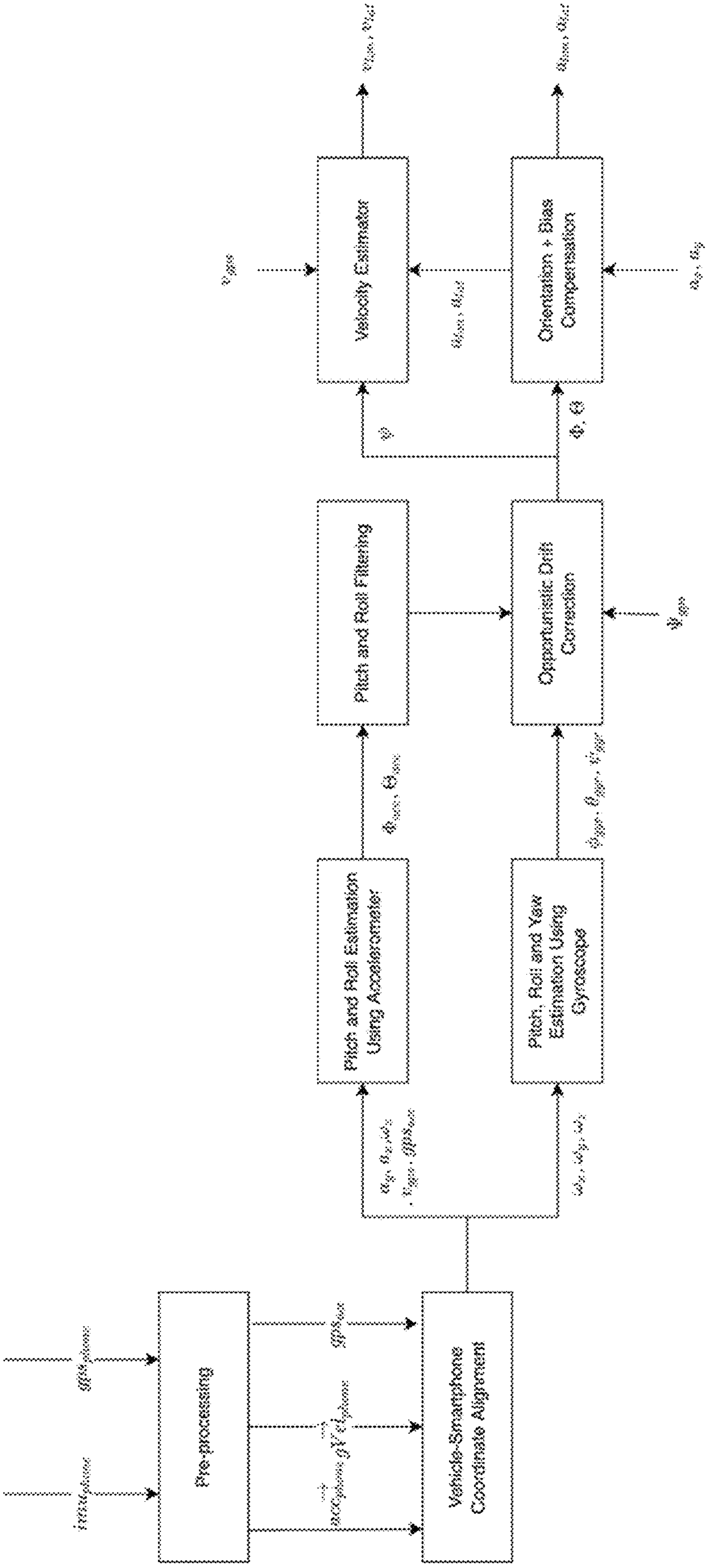
FIG. 16: Offline Estimation Framework for the estimation of Vehicle States.

FIG. 16 illustrates the architecture of an example offline system for the estimation of vehicle states according to an embodiment of the present disclosure. Raw data from sensors of a personal device may be pre-processed (as described above). Estimates of a vehicle's pitch and roll may be computed using calibrated/aligned data from the accelerometer in the "Pitch and Roll Estimation Using Accelerometer." In this module, the acceleration computed from GPS velocity is used as an input along with the acceleration in the forward direction from the accelerometer of the sensing device to estimate pitch. The centripetal acceleration computed using the yaw-rate from the gyroscope may be used as an input along—with the lateral acceleration from the accelerometer of the sensing device to estimate roll. Estimates of a vehicle's pitch, roll, and yaw may be computed using calibrated/aligned data from the gyroscope in the "Pitch, Roll, and Yaw Estimation Using Gyroscope." In this module the pitch, yaw, and roll rate inputs from the gyroscope are integrated to estimate the Pitch, Roll, and Yaw. The "Pitch and Roll Filtering" module opportunistically selects pitch and roll estimations from the accelerometer during stable driving phases to handle error prone estimations from accelerometer due to unstable vehicle dynamics.

The above estimated filtered pitch and roll from the accelerometer are used as an input to opportunistically correct the drift associated with the pitch and roll estimations from the gyroscope in the "Opportunistic Drift Correction" module. Moreover, the bearing information from the sensing device's GPS is used to correct the drift associated with the yaw estimations from the gyroscope.

The drift corrected estimation of vehicle's orientation (pitch, yaw; and roll) is fed as an input to "Orientation+Bias Compensation module," where the longitudinal and lateral acceleration from the sensing device's accelerometer is compensated for the varying orientation of the vehicle due to road geometry and the accelerometer bias. The compensated longitudinal and lateral acceleration of the vehicle are fed to the "Velocity Estimator" module, where the compensated accelerations are fused with GPS velocity to estimate the longitudinal and lateral velocity of the vehicle.

A novel kinematic sensor fusion framework using a prior grade map to estimate 6DOF vehicle states using smartphones/generic sensing devices: The previous generic sensing device-based methods primarily focus on the estimation of linear acceleration of the vehicle, which in turn can be used to estimate vehicle's velocity and location. However, as mentioned previously, linear acceleration using traditional methods is reliable only to the extent of detecting events such as braking, acceleration, turning, etc. and not for estimating vehicle's velocity and location. An embodiment of the present method may use a crowd-sourced road grade map as an auxiliary sensor to compensate for the unavailability of a high capability and precision measurement sensor such as e.g., commercial grade GPS. Specifically, using a prior road grade map allows for the generation of measurements of vehicle pitch which in traditional methods come from a commercial grade GPS. A standalone GPS on a low-cost generic sensing device is not capable of generating reliable measurements of vehicle pitch.

Decoupling the estimation of vehicle orientation from other vehicle states such as acceleration and velocity: To handle noisy smartphone's sensors, the present framework is made up of cascaded kalman filters, where we first estimate vehicle's pitch, yaw, and roll (or orientation) using separate kalman filters. The output of these filters may then be fed as control input along with acceleration from smartphone into longitudinal and lateral velocity estimation kalman filters to estimate vehicle velocity. This architecture is fundamentally different to traditional vehicle state estimation frameworks, where vehicle orientation is treated as states in the fusion framework. The traditional methods work well under the assumption of high quality and well calibrated sensors, especially the GPS, which has better capabilities, accuracy and sampling frequency compared to the ones on generic sensing devices. This decoupling results in more stable fusion, where the frequent highly unreliable GPS measurements from smartphones do not interfere with the orientation estimates and in-turn the velocity estimates resulting in more robust estimation of vehicle states.

Opportunistic estimation of sensor errors: Due to the unavailability of a reliable measurement sensor on generic sensing devices (i.e., the GPS), frequent error prone GPS measurements might result in de-stabilizing the presently disclosed fusion framework. To account for this, measurements from GPS may be "turned off" (ignored) during periods of outage (inferred using visible satellites) and solely rely on the IMU's to estimate vehicle states. To do this, sensor biases and drifts are opportunistically estimated during periods of availability of reliable measurements from GPS and prior road grade and such estimations are "replayed" during periods of outage.

Figure 17:
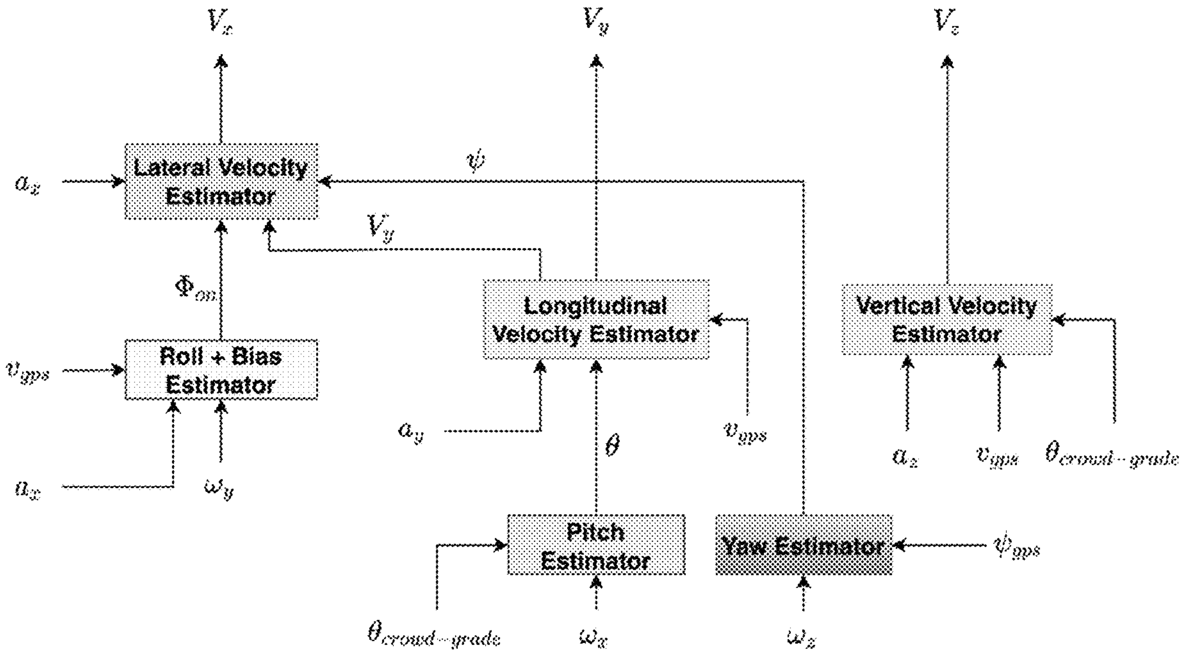
FIG. 17: Online Vehicle State estimation framework.

FIG. 17 illustrates the architecture of an embodiment of a Vehicle State Estimation framework. The Pitch Estimator and Yaw Estimator are linear Kalman filters that estimate the vehicle's pitch (θ) and yaw (ψ), respectively. The Roll+Bias Estimator is the linear Kalman Filter, which estimates the signal Φon that encapsulates vehicle's roll (ϕ) and the lateral accelerometer bias (β). The calibrated angular velocities (ωx, ωy, and ωz) from the gyroscope act as the control input for the filters. A prior road grade map may be used as the measurement in the Pitch Estimator. For the Roll+Bias Estimator, the measurements may be derived from smartphone's GPS velocity (vgps) and the yaw-rate (ωz) from gyroscope. Bearing from a smartphone's GPS is used as the measurement signal in the Yaw Estimator.

The orientation estimations are fed into the velocity estimators. Specifically, the Longitudinal Velocity Estimator is an Extended Kalman filter that uses pitch (θ) and longitudinal acceleration of the vehicle ($\alpha_y$) as control inputs. The velocity measurements may be provided by the smartphone's GPS ($V_{gps}$). The Lateral-Velocity estimator integrates the compensated lateral acceleration to estimate the lateral velocity of the vehicle. The output of the from the Roll+Bias estimator (Φon) may be used to compensate the acceleration reported by the smartphone (ax). Longitudinal velocity from the Longitudinal-Velocity Estimator (Vy) along with the yaw from the Yaw-Estimator (ψ) may be used to compensate for the centripetal acceleration due to vehicle rotation. The Lateral Velocity Estimator may be triggered only when the system detects "significant" deviations in the yaw-rate signal from the gyroscope, i.e., when the vehicle is turning or performing lane-changing maneuvers. The Vertical Velocity Estimator may be a linear Kalman filter that uses vertical acceleration ($\alpha_z$) as the control input. The measurements are estimated by decomposing the velocity from GPS ($V_{gps}$) into horizontal and vertical components using the prior road grade map.

In more detail, the prior road grade map may be used as a calibration sensor where it is used as an auxiliary input in the "Pitch Estimator" to estimate vehicle's pitch and the associated drift and bias of the pitch rate signal from the gyroscope. "Yaw Estimator" calibrates the yaw gyroscope by estimating the pitch and bias associated with the raw rate signal. "Roll+Bias Estimator," similarly calibrates the roll gyroscope. The longitudinal accelerometer on sensing devices may be calibrated by estimating its bias and drifts by fusing the estimated vehicle's pitch and information from the sensing device's GPS to estimate vehicle's longitudinal velocity and acceleration in the "Longitudinal Velocity Estimator." Similarly, calibration of the vertical accelerometer is shown in the "Vertical Velocity Estimator."

The above-mentioned estimation of a sensing device's sensors calibration parameters/drift and bias is advantageous in reliable estimation of vehicle states during prolonged periods of GPS outages, which is a frequent phenomenon, especially in urban areas. To do this, error parameters for the sensing device's sensors are opportunistically estimated during periods of availability of reliable measurements. In some embodiments, the following criteria may be used:

Quality of GPS signal: which is inferred using the number of visible satellites/estimated position accuracy measure reported by GPS receivers on a generic sensing device.

Stability of vehicle dynamics: the longitudinal accelerometer bias may be opportunistically estimated when the vehicle exhibits stable dynamics. Such periods are filtered out using the jerk of the vehicle.

Road Geometry: the yaw gyroscope and roll gyroscope bias may be opportunistically estimate on road segments that are straight/or when the vehicle is driving straight. Such periods may be identified using the road curvature map in conjunction with the gyroscope information from the sensing device. The intuition is that on straight road segments both the yaw and roll of the vehicle should remain constant over long intervals and any variation/drift can be attributed to the gyroscope drifts. Pitch gyroscope bias may be opportunistically estimated on road segments that are level/constant grade.

These opportunistically estimated sensor errors may be maintained in memory and are replayed in the kalman filter fusion framework when the measurements from the GPS become unreliable—e.g., when driving in the urban areas and there is no direct path to the satellites. Moreover, such a system can be used to improve energy efficiency of sensing devices while navigation by reducing the GPS duty-cycle.

Crowd-Source Aggregation

As discussed above, in another aspect, the present disclosure may be embodied as a method 200 for estimating road geometry features using crowd-sourced sensor data. The method 200 includes collecting 203 gyroscope data, accelerometer data, and GPS data from a plurality of trips over a road segment. Any particular trip over the road segment may include less than all three data sets (gyroscope, accelerometer, and GPS). The accelerometer data from each trip is aggregated 206 (for example, as described above). Each of the gyroscope data are corrected 209 using the aggregated accelerometer data (e.g., for drift of the gyroscope(s)). The corrected gyroscope data are aggregated 212. The method includes determining 215 the road geometry features based on the aggregated gyroscope data. The method may include matching the accelerometer data and/or gyroscope data using the GPS data.

Road Geometry Aware Speed Control of a Vehicle

Continuing progress in the autonomous driving field enables rapid developments in advanced driving assistance systems (ADAS). Among them the adaptive cruise control (ACC) has been widely implemented in road vehicles. By automatically adjusting the acceleration and deceleration via throttling and braking, an ACC vehicle is able to maintain a safe following distance from its preceding one. Through exploiting the basic ACC idea, various enhanced ACC methods have been developed with the goal to increase the vehicles' fuel efficiency, safety, comfort, and tracking accuracy. The embodiment described in this section provides a road geometry aware longitudinal control method for cruise control (CC) or ACC in vehicles. In contrast to the previous methods, the present system takes advantage of fine-grained/high resolution road grade information to output optimal control for the vehicle, where driving comfort and safety is given priority over the factors such as fuel efficiency. To generate "human-like" and comfortable control output, a data-driven approach is used to model the acceleration/deceleration behavior for an individual/or a population of drivers. To provide for driving safety, the present method accounts for the vertical curvature of the road (including bumps/depressions), where appropriate control output is generated if, for example, the vehicle is approaching a vertical curve too quickly.

Figure 20:
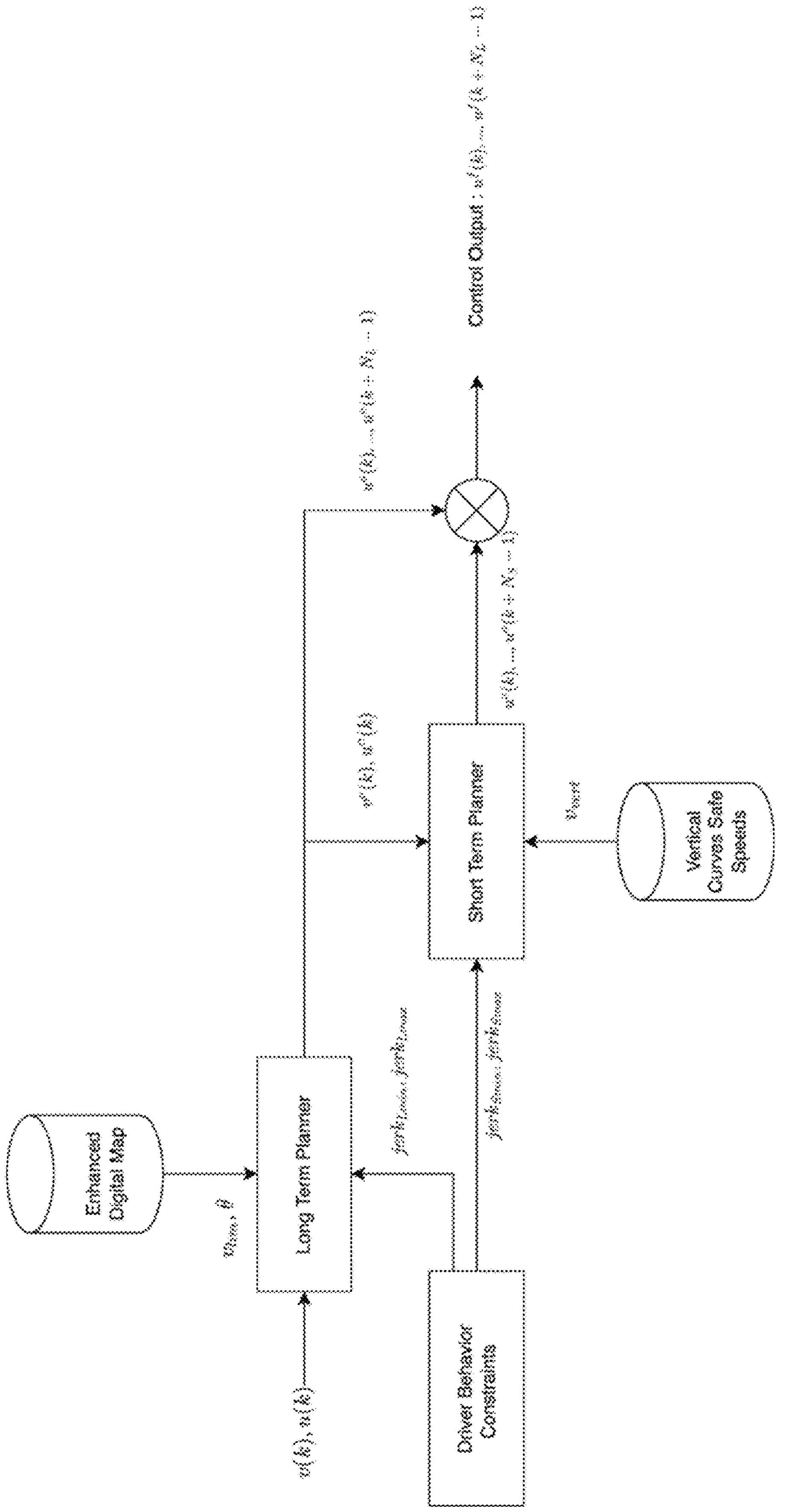
FIG. 20: Example system for vertical road geometry aware vehicle speed control.
Figure 25:
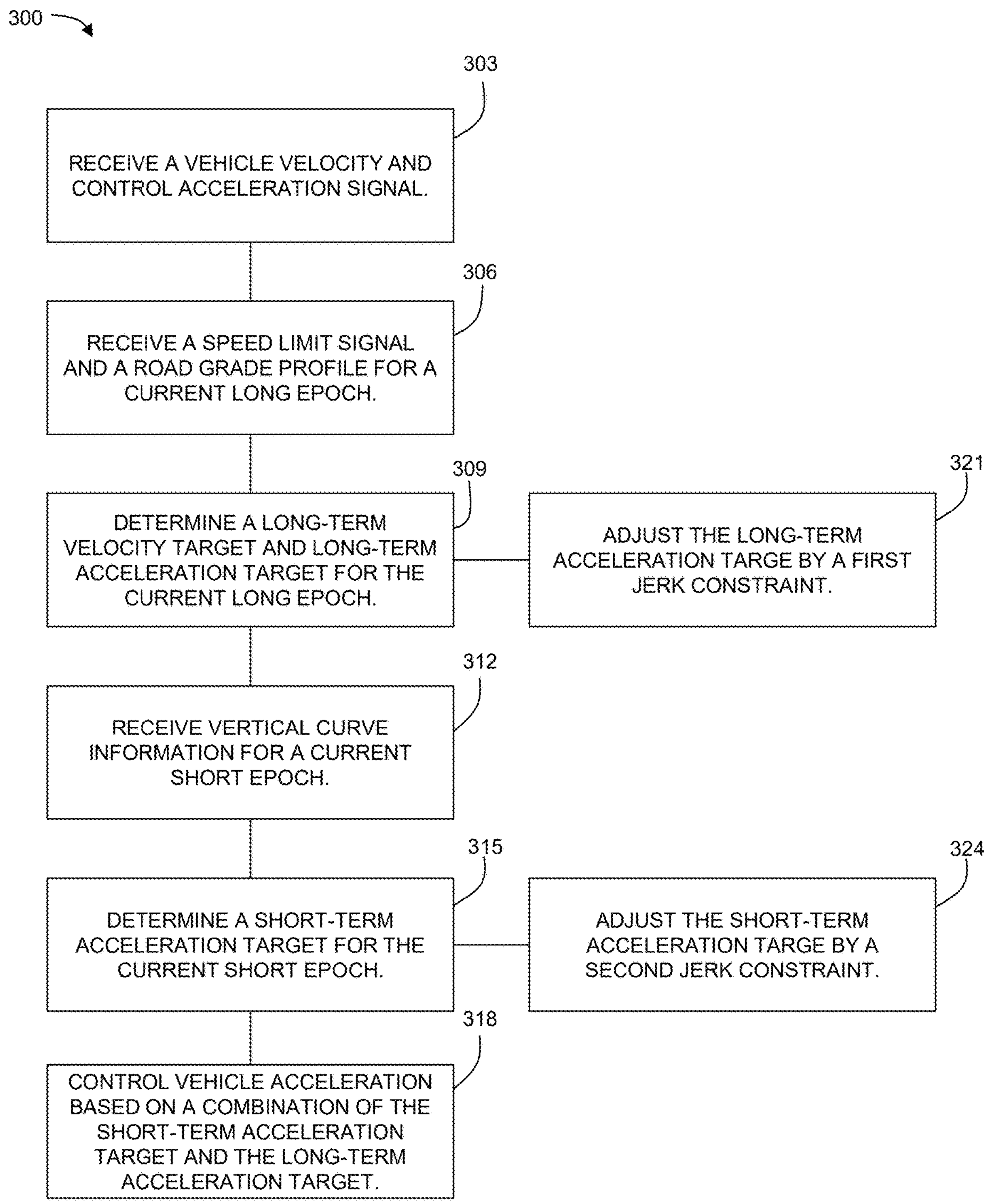
FIG. 25: A chart depicting a method vehicle control according to another embodiment of the present disclosure.

With reference to FIGS. 20 and 25, in another aspect, the present disclosure may be embodied as a method 300 for speed control of a vehicle. The method utilizes two optimizers: (a) a long-term planner, which considers long event horizon distances (NL)—e.g., greater than 500 m; and (b) a short-term planner, which considers short event horizon distances—e.g., less than 100 m. The long-term planner takes as input the current velocity and control acceleration signal of the vehicle and outputs the velocity and control acceleration signal for the next NL steps. For optimization, the long-term planner utilizes speed limit information and road grade profile information for the event horizon distance (long epoch). As such, the method 300 includes receiving 303 a vehicle velocity and control acceleration signal and receiving 306 a speed limit signal and a road grade profile for a current long epoch. A long-term velocity target and long-term acceleration target is determined 309 for the current long epoch based on the vehicle velocity, the control acceleration signal, the speed limit signal, and the road grade profile.

The short-term planner outputs the short-term control acceleration output by taking into account the output velocity and acceleration for the current time step from the long-term planner. For optimization, the short-term planner may account for safe negotiating speed of incoming vertical curves in the event horizon distance (short epoch), if any. The method 300 includes receiving 312 vertical curve information for a current short epoch. A short-term acceleration target is determined 315 for the current short epoch based on the long-term velocity target and long-term acceleration target, and the vertical curve information.

The output control signals from the long-term planner and the short-term planner may be fused to output the final control acceleration. Vehicle acceleration is controlled 318 based on a combination of the short-term acceleration target and the long-term acceleration target. In some embodiments, the short-term planner may be activated only when there is a vertical curve in the short-term event horizon distance. If there is no upcoming vertical curve, the output from the long-term planner is taken as the final control output for the vehicle.

In some embodiments, the long-term planner may account for driver behavior constraints (e.g., minimum and maximum jerk) to generate comfortable/smooth and realistic control output. The method may further include adjusting 321 the long-term acceleration target by a first jerk constraint, wherein the first jerk constraint is selected from values between a $40^{th}$ and $60^{th}$ percentile of a set of driver values.

Similarly, in some embodiments, the short-term planner may account for driver behavior constraints (e.g., minimum and maximum jerk) to generating human-like and smooth control acceleration output the short-term planner. The method may further include 324 adjusting the short-term acceleration target by a second jerk constraint, wherein the second jerk constraint is selected from values between a $70^{th}$ and $90^{th}$ percentile of a set of driver values.

Driver behavior constraints may be stored in, for example, a "Driver Behavior Constraints" Module having stored therein the distributions of the longitudinal jerk. The distributions may be generated in a data-driven manner using sensor information from devices capable of sensing longitudinal acceleration of the vehicle. For example, such information can be generated from extracted acceleration/deceleration profiles from device's accelerometer, GPS, or wheel speed sensor. The distribution can be created for individual drivers or can represent the behavior of a population of drivers. Different sets of constraints on jerk are used by the long-term planner and the short-term planner. For example, for long-term planning, the maximum jerk constraints can be sampled from close to the mean of the distribution (e.g., $40^{th}$ percentile and $60^{th}$ percentile). This value will represent the limit on the "mild" jerk perceived by an individual or population of drivers. For short-term planning, the maximum jerk constraints can be sampled from the fringe of the distribution (e.g., $70^{th}$ and $90^{th}$ percentile). This value will represent harsher deceleration behavior which the individual or the population of drivers perceives as comfortable. Furthermore, velocity dependent "perceived danger" can be incorporated. For example, while traveling at high velocities, the danger perceived by a human driver is more and the driver will be more conservative while accelerating/decelerating—i.e., the constraint on jerk/acceleration should be stricter. To do this, separate distributions of jerk are created for different operating speeds of the vehicle. For example, separate distribution for the speed range of 30-50 km/hr and for 70-80 km/hr. By doing this, the constraints on acceleration/jerk will be dependent on the current velocity of the vehicle.

The long-term planner outputs a low-frequency "human-like" acceleration control response given the upcoming road grade and desired speed given by the speed limit of the road. Additional constraints can be added to the long-term planner to optimize energy efficiency in addition to the driver comfort as done above. The short-term planner outputs a high-frequency "human-like" acceleration control to react to the upcoming vertical curve. The output of the short-term planner can be considered as a high frequency disturbance. The final acceleration control output may be generated by combining the high frequency disturbance from the short-term planner to the low-frequency output of the long-term planner.

Vertical Curves Safe Speed Estimation

Figure 21:
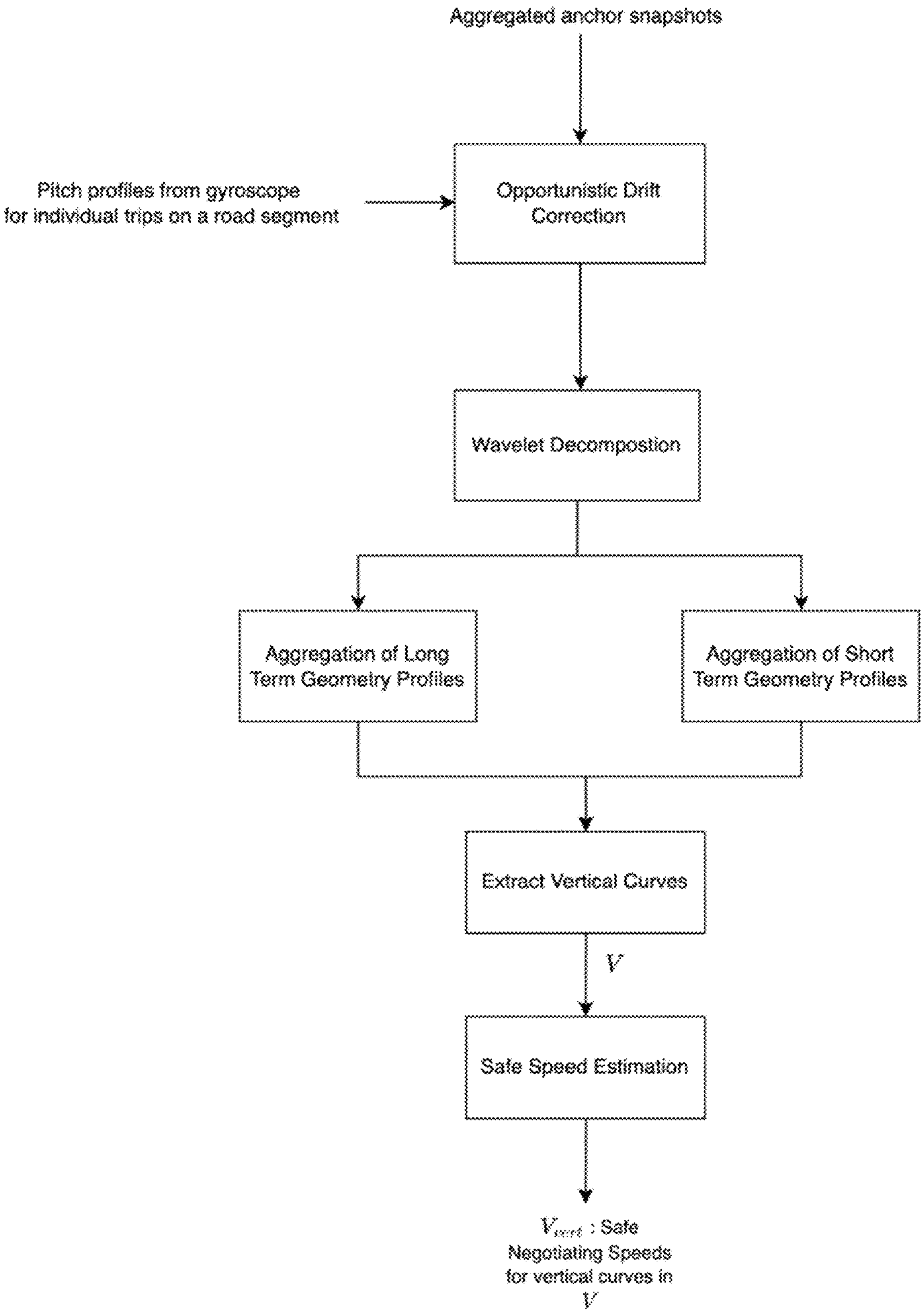
FIG. 21: Safe negotiating speed estimation for vertical curves.

The Crowd-Sourced Road Geometry estimation method may be extended to estimate safe speeds to negotiate vertical curves on the road. FIG. 21 illustrates an example embodiment. The drift-corrected pitch profiles from individual trips may be decomposed into different frequency bands in the distance domain using wavelet decomposition. Specifically, the data may be decomposed into two kinds of road geometry profiles. (a) Long-term road grade (low frequency): changes that happen over long distances (typically >100 m). These features are the gradual road grade changes that occur when the road changes shape. For e.g., changes in road grade when the vehicle is going over a bridge. (b) Medium-term road grade (mid-frequency): changes that occur over short distances (<10 m). These profiles will typically represent small variations in road grade due to depressions, bumps, etc.

Figure 22:
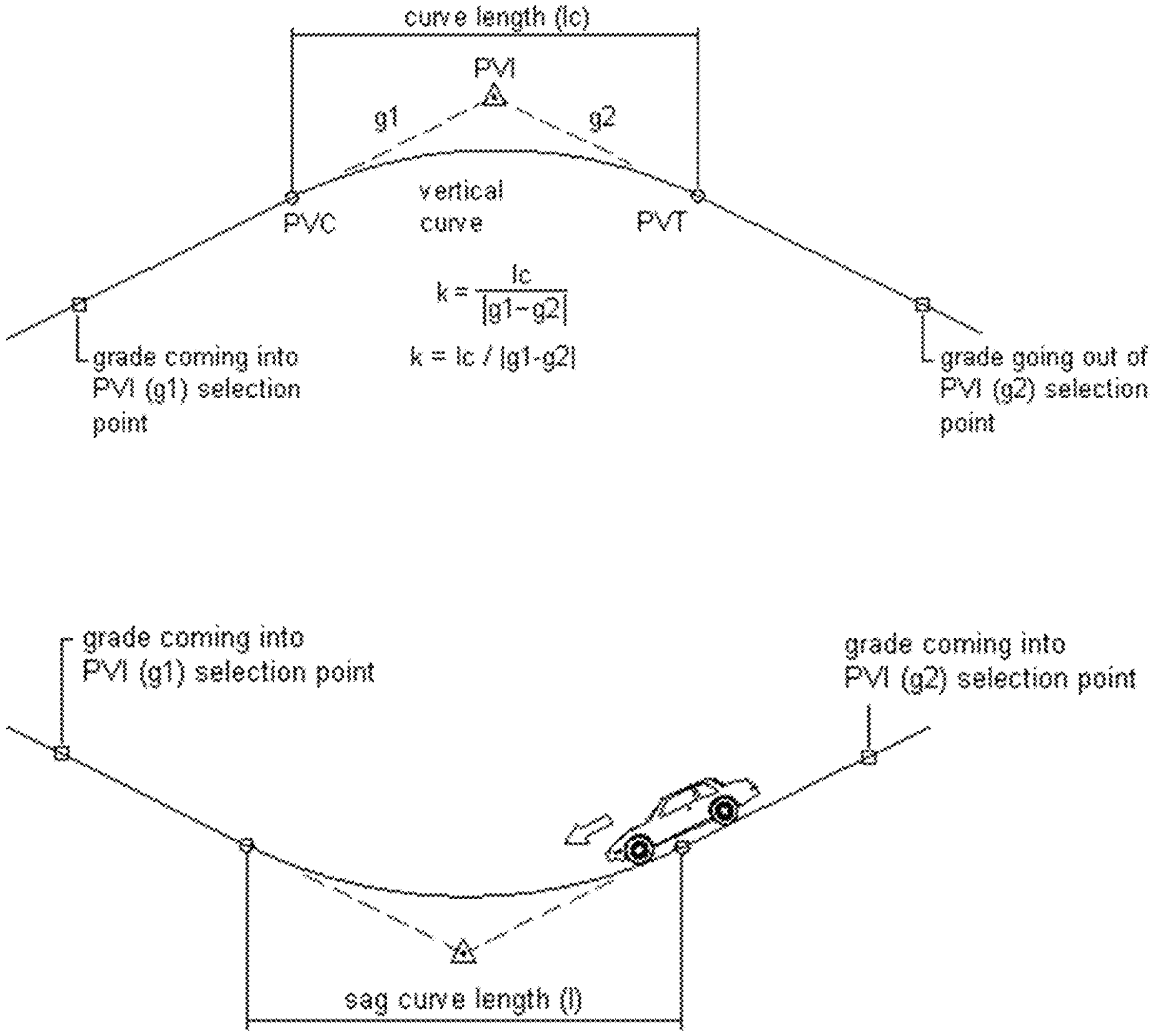
FIG. 22: Vertical curve design.
Figure 23:
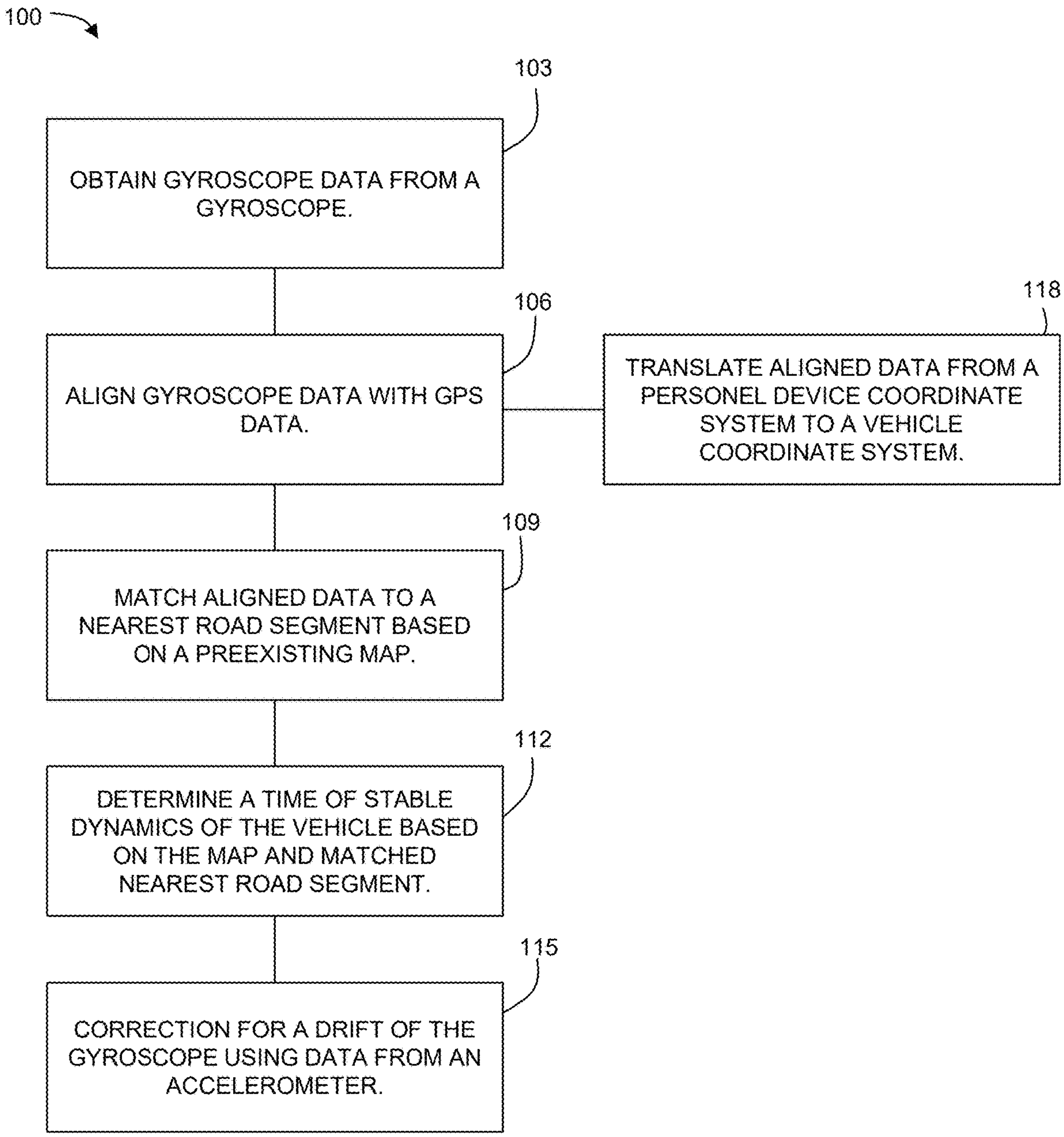
FIG. 23: A chart depicting a method for collecting road geometry information according to another embodiment of the present disclosure.
Figure 24:
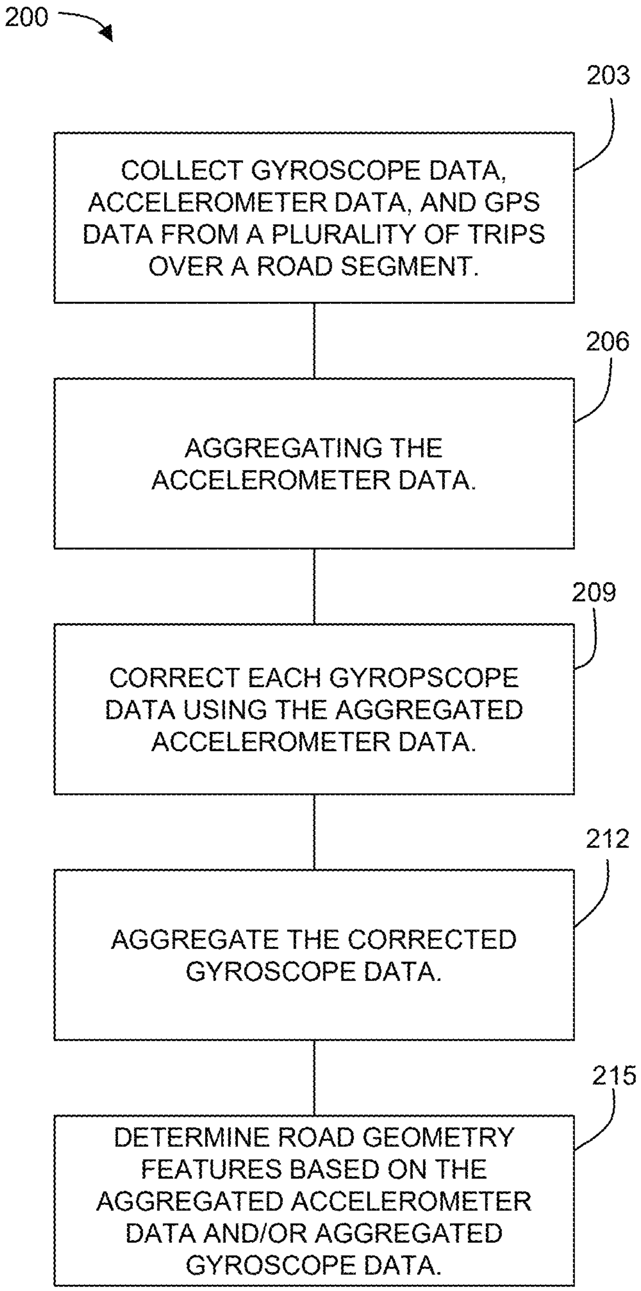
FIG. 24: A chart depicting a method for crowd-sourced road geometry determination according to another embodiment of the present disclosure.

The decomposed pitch signals from individual trips may then be aggregated to estimate the road grade profiles for the above mentioned two types of grade signals. The "Extract Vertical Curves" module detects and extracts vertical curves in the aggregated road grade profiles. Finally, geometric features of the extracted vertical curves on the road may be used to estimate the safe negotiating speed. FIG. 22 illustrates the geometric design of vertical curves. One example method would be to use the incoming (g1) and outgoing (g2) grade values on a vertical curve along with the horizontal distance between the two to calculate the k value for the curve. The k value can be looked up into the k value to safe speed mapping table prescribed by civil engineering standards to get the safe negotiating speed for the vertical curve.

Further Discussion—Using Road Geometry Signatures for Enhanced Vehicle State Estimation and Localization Using Generic Sensing Devices System Overview In another embodiment of the present disclosure, a system provides (a) integration of road geometry based feature mapping and localization with the vehicle state estimation; and (b) generation of a feature map that is dependent only on road geometry features and that is agnostic to local disturbance from vehicle dynamics and varying factors such as vehicle properties, sensor error characteristics, sensor calibration and mounting errors. This is achieved by generating road geometry features in a crowd-sourced manner by performing quality aware aggregation.

Figure 18:
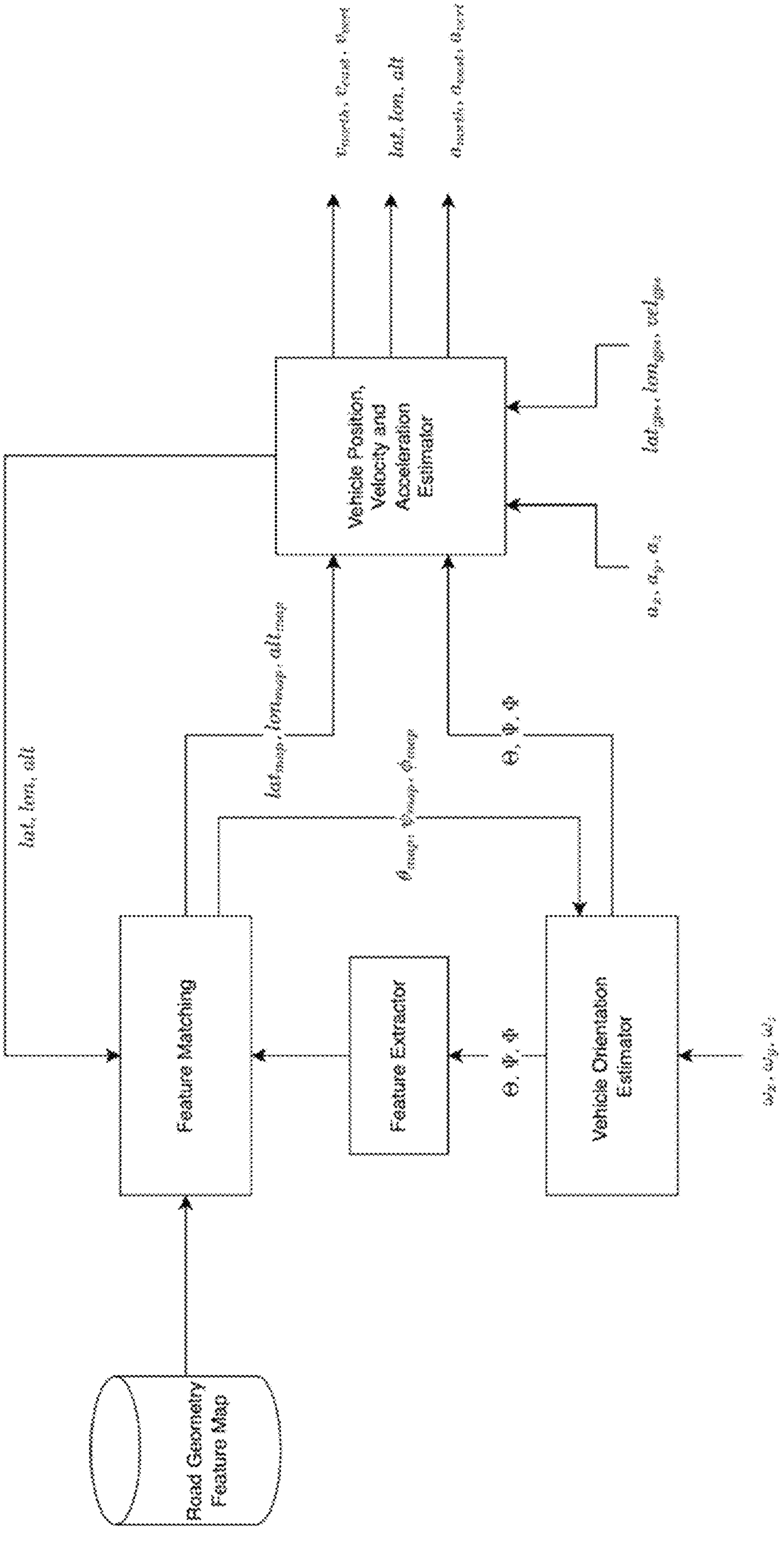
FIG. 18: System architecture form road geometry features based localizer.

FIG. 18 demonstrates the architecture of a system according to the present embodiment. A vehicle orientation estimator fuses the incoming signal from a calibrated/aligned gyroscope of a sensing device (pitch rate, yaw rate, and roll rate) with the information on road geometry—i.e., road grade, curvature, and transverse slope to output vehicle's orientation (pitch, yaw; and roll). A Feature Matching module compares the incoming features from the vehicle orientation signal (extracted by a Feature Extractor module) against the features from the prior road geometry map to output the current location of the vehicle and the geometry of the road the vehicle is on. The output road geometry is fed back into the Vehicle Orientation Estimator, where it is used as a measurement in the fusion framework. The Vehicle Position, Velocity and Acceleration Estimator fuses the signal on vehicle's orientation, acceleration from the sensing device, position and velocity from the device's GPS and the output matched position from the Feature Matching module to output vehicle's 3D position, velocity, and location. The estimated position is fed back into the Feature Matching module to optimize the feature matching process.

In this example system, Road Geometry feature matching is integrated with the vehicle state estimation framework. In this way, the system is able to leverage the matched road geometry and location information as measurements in the fusion frameworks of vehicle's orientation and velocity, location, and acceleration estimation. Firstly, the above-mentioned fusion results in improved overall vehicle state estimation reliability, especially for generic sensing devices that are characterized by high noise due to low-quality sensors, arbitrary orientation, and possible loose mounting. Secondly, the filtered vehicle states output by the fusion are then fed back to the feature matching module for improved robustness in the matching process.

In more detail, a prior road geometry feature map is used in the estimation of vehicle states. The prior map may be used as a calibration sensor where information on road grade, transverse slope, and curvature is used as an auxiliary sensor in the fusion process to estimate vehicle's orientation—i.e., the pitch, roll, and yaw respectively and the associated drift and bias of the sensing devices sensors. As mentioned above, the raw output from the sensing device's gyroscope may be fused with the prior crowd-sourced road geometry information. As an output of this fusion, the bias and drift associated with the gyroscope present in the generic sensing device are estimated along with the orientation of the vehicle. Therefore, in effect, the road geometry information is used to calibrate the IMU's on sensing devices by performing the above-described processes for fusion and estimating sensor errors.

Similarly, an accelerometer of the sensing device may be calibrated by estimating its bias and drift by fusing the matched location from the map, the estimated vehicle's orientation, and information from the sensing device's GPS to estimate vehicle's 3D velocity, acceleration, and position. It is noted that the errors associated with the sensing device's accelerometer may be significantly large as compared to properly mounted and well calibrated sensors present in instrumented vehicles due to the possibility of arbitrary orientation inside the vehicle.

In the Feature Matching module, a particle filter is used to keep track of the vehicle's position on the road network. The particles represent the distribution of possible locations of the vehicle. The input vehicle velocity and position from the Vehicle Position and Location estimator is used as the control input to propagate the particles in space. The weight of the particles is updated based on the similarity between the incoming features from the Vehicle Orientation Estimator and the prior Road Geometry Feature Map. Instead of using GPS position/velocity directly as an odometer (which can be unreliable due to factors such as outage, urban canyons and is characterized by low sampling frequency (Typically 1 Hz)), the fused velocity is used as an odometer in our framework to update the particle's state. Previous approaches rely on access to a vehicle's odometer via CAN bus or a high precision GPS, the availability of which might not be the case when using generic sensing devices.

Road Geometry Feature Map Generation

Figure 19:
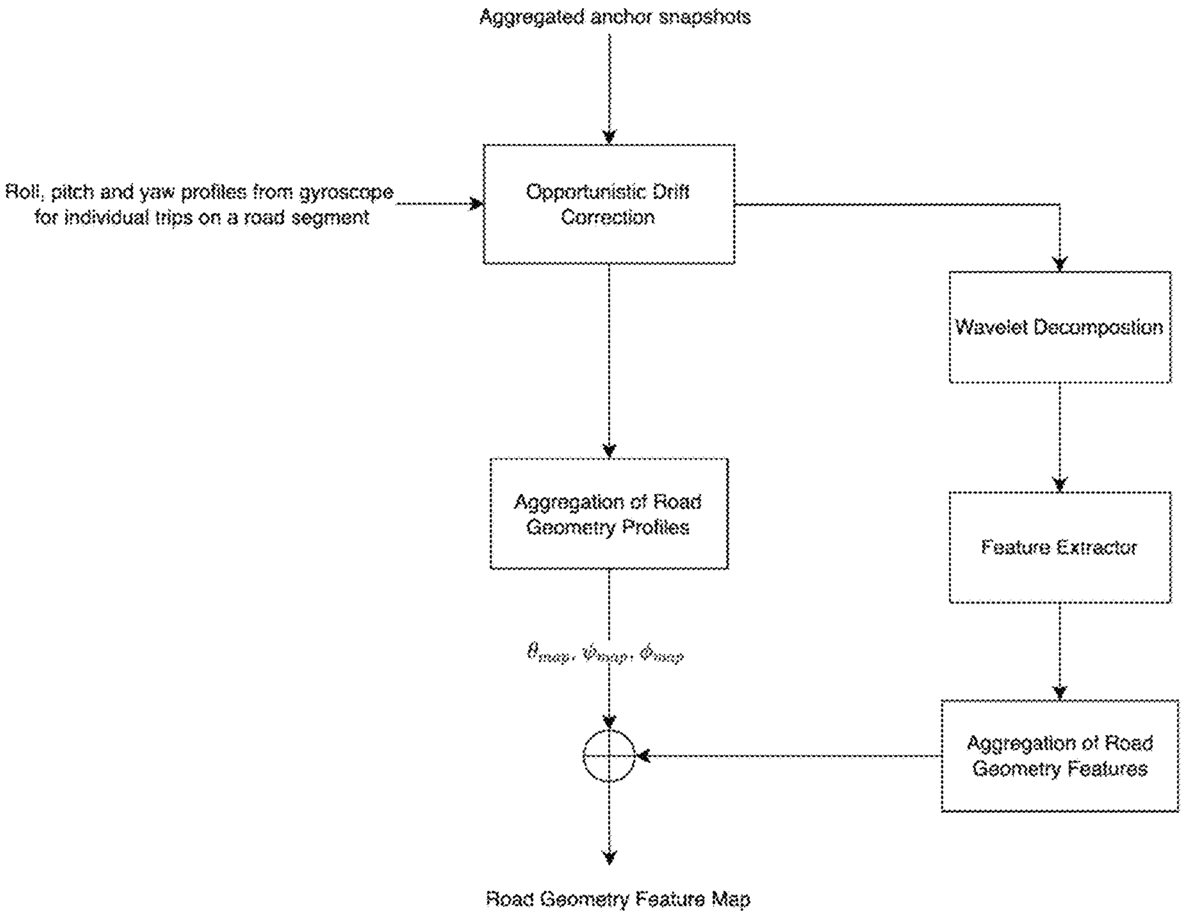
FIG. 19: Road Geometry feature map generation.

FIG. 19 illustrates the system for generating road geometry feature maps. The system is assumed to be offline and running on a remote server where the sensor data from various trips on a road segment is available for further processing. First, the raw roll, pitch, and yaw information from the sensing device's gyroscope for individual trips are corrected for drift in the "Opportunistic Drift Correction" module. Aggregated anchor snapshots, which are sparse aggregated observations from sensing devices' accelerometers on a road segment are used to correct the drift. The drift corrected geometry profiles from individual trips are aggregated to estimate the grade, transverse slope, and curvature profiles of a road segment. To estimate road geometry features, the drift corrected profiles are decomposed into the underlying frequency bands by performing wavelet decomposition. The decomposed signals are then passed through the Feature Extractor to generate geometry features for the respective signals of different frequency bands. These features from individual trips are then aggregated in a quality aware manner to generate crowd-sourced features for a road segment. Finally, these features are concatenated with the crowd-sourced road geometry information—i.e., grade, transverse slope and curvature to output the final road geometry feature map.

A road geometry feature map is created that is agnostic to factors such as driving conditions, vehicle dynamics, and sensor characteristics and are only correlated to the underlying geometry of the road vehicle is travelling on. As mentioned above, the orientation signal from IMU can be polluted from factors such as vehicle dynamics, vehicle properties, etc. To counter this, the extracted features may be aggregated from individual trips in a quality aware manner. The weighted average done by the above quality aware aggregation will mellow down the impact of errors from the above-mentioned factors and will converge to features that are more representative of the underlying road geometry.

For extracting the features from individual vehicles, we focus on three kinds of road geometry features: (a) Long-term road geometry (low-frequency): changes that happen over long distances (typically >100 m). These features are the gradual road geometry changes that occur when the road changes shape—e.g., changes in road grade when the vehicle is going over a bridge or changes in yaw and transverse slope of the road on a turn. (b) Medium-term road geometry (mid-frequency): changes that occur over short distances (<10 m). These features typically represent small variations in road geometry due to depressions, bumps, etc. (c) Short-term road geometry (high frequency): These features typically represent road geometry changes over very short distances (typically <1 m)—e.g., potholes, cracks, etc. To extract these features, a wavelet decomposition is applied to the drift corrected pitch, roll, and yaw signals to extract different frequency components from the signal. The features extracted are change of geometry per unit distance, maximas, minimas, and the inflection points. These features from individual vehicles are then aggregated in a quality-aware manner to counter noise due to events such as vehicle dynamics and varying factors such as vehicle properties. Existing approaches create maps from vehicle orientation information. In contrast, the present approach creates maps from road geometry information. Vehicle orientation information captures vehicle vibrations and changes to vehicle dynamics. The vehicle vibrations will differ from vehicle to vehicle (depending on suspension properties, etc.) Also, vehicle vibrations may change due to changing road conditions. Road geometry changes slowly as compared to road surface conditions. The present technique uses road geometry specific features such as absolute values (by using filtered orientation), inflection points, maximas, minimas, and rates of change in geometry.

In another aspect, the present disclosure may be embodied as a system for performing any of the methods disclosed herein. For example, a system may include a processor programmed to perform any of the methods disclosed herein. As will be apparent, such a system may include a gyroscope, a GPS receiver, and/or an accelerometer. The system may be a personal device as disclosed herein. The system may be affixed to a vehicle. In a more particular example, a system may include a gyroscope, an accelerometer, a GPS receiver, and a processor in electronic communication with the gyroscope, accelerometer, and GPS receiver. The processor may be programmed to obtain gyroscope data from the gyroscope: align the gyroscope data with GPS data from the GPS receiver (GPS module) to generate aligned data: match the aligned data to a nearest road segment based on a preexisting map: determine a time of stable dynamics of the vehicle based on the map and the matched nearest road segment; and correct a drift of the gyroscope using data from the accelerometer during the determined time of stable dynamics.

The processor may be in communication with and/or include a memory. The memory can be, for example, a random-access memory (RAM) (e.g., a dynamic RAM, a static RAM), a flash memory, a removable memory, and/or so forth. In some instances, instructions associated with performing the operations described herein (e.g., aligning gyroscope data with GPS data, etc.) can be stored within the memory and/or a storage medium (which, in some embodiments, includes a database in which the instructions are stored) and the instructions are executed at the processor.

In some instances, the processor includes one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general-purpose processor, a central processing unit (CPU), an accelerated processing unit (APU), a field-programmable gate array (FPGA), an application specific integrated circuit (ASIC), a digital signal processor (DSP), and/or the like.

The term "module" is used herein for convenience and should be broadly construed. For example, a module may be implemented in hardware using a circuit of discrete components, integrated circuits, or otherwise. In another example, a module may be implemented in software that runs on a processor.

Although the present disclosure has been described with respect to one or more particular embodiments, it will be understood that other embodiments of the present disclosure may be made without departing from the spirit and scope of the present disclosure.

What is claimed is:

1. A method for collecting road geometry information, comprising:

obtaining gyroscope data from a gyroscope of a personal device fixed to a moving vehicle and accelerometer data from an accelerometer of the personal device;

aligning the gyroscope data with GPS data from a GPS module of the personal device to generate aligned data;

matching the aligned data to a nearest road segment based on a preexisting map;

determining a time of stable dynamics of the vehicle based on the map and the matched nearest road segment; and correcting a drift of the gyroscope using the accelerometer data during the determined time of stable dynamics.

2. The method of claim 1, wherein a pitch drift of the gyroscope is corrected.

3. The method of claim 2, wherein correcting the pitch drift of the gyroscope comprises computing a pitch estimation from the accelerometer and selectively using the pitch estimation from the accelerometer during a stable driving phase of the vehicle.

4. The method of claim 3, wherein correcting the pitch drift of the gyroscope comprises:

computing pitch estimations from the accelerometer;

filtering the pitch estimations by selecting only pitch estimations obtained during stable driving phases of the vehicle; and using the selected pitch estimations to correct the pitch drift of the gyroscope.

5. The method of claim 2, wherein estimating pitch of the vehicle from the gyroscope data comprises integrating pitch-rate input from the gyroscope to obtain a gyroscope-based pitch estimate.

6. The method of claim 5, further comprising:

obtaining road grade estimates for the nearest road segment from the preexisting elevation database using GPS data from the personal device;

determining one or more regions based on a shape similarity between the road grade estimates and the gyroscope-based pitch estimate;

estimating a bias associated with anchor snapshots selected during stable driving phases of the vehicle using the road grade estimates in the one or more regions;

correcting the anchor snapshots based on the estimated bias to generate corrected anchor snapshots; and using the corrected anchor snapshots to correct the pitch drift of the gyroscope.

7. The method of claim 1, further comprising obtaining an elevation profile using a preexisting elevation database.

8. The method of claim 1, wherein a roll drift of the gyroscope is corrected.

9. The method of claim 1, wherein a yaw drift of the gyroscope is corrected.

10. The method of claim 1, further comprising translating the aligned data from a personal device coordinate system to a vehicle coordinate system.

11. The method of claim 10, wherein translating the aligned data comprises:

calculating a gravity vector when the vehicle is stationary;

calculating a vehicle forward direction vector.

12. The method of claim 1, wherein the gyroscope data is aligned with the GPS data by peak matching.

13. A method for estimating road grade using crowd-sourced sensor data, comprising:

collecting gyroscope data, accelerometer data, and GPS data from a plurality of trips over a road segment;

aggregating the accelerometer data from each trip;

correcting each of the gyroscope data using the aggregated accelerometer data;

aggregating the corrected gyroscope data;

determining the road grade based on the aggregated gyroscope data; and updating a road geometry feature map associated with the road segment using the determined road grade.

14. The method of claim 13, wherein aggregating the accelerometer data comprises aggregating bias-corrected anchor snapshots from the plurality of trips over the road segment to reduce sparsity in the anchor snapshots.

15. The method of claim 14, wherein correcting each of the gyroscope data comprises using the aggregated bias-corrected anchor snapshots to correct pitch drift in a gyroscope-based pitch estimate for each trip.

16. The method of claim 15, wherein aggregating the corrected gyroscope data comprises aggregating the pitch-drift-corrected gyroscope-based pitch estimates from the plurality of trips to obtain a continuous road grade profile for the road segment.

17. The method of claim 16, wherein the filtered accelerometer-based pitch estimates comprise anchor snapshots.

18. The method of claim 16, wherein aggregating the bias-corrected anchor snapshots and aggregating the pitch-drift-corrected gyroscope-based pitch estimates each comprise performing quality-aware aggregation using a truth discovery framework.

19. A method for speed control of a vehicle, comprising:

receiving a vehicle velocity and control acceleration signal:

receiving a speed limit signal and a road grade profile for a current long epoch;

determining a long-term velocity target and long-term acceleration target for the current long epoch based on the vehicle velocity, the control acceleration signal, the speed limit signal, and the road grade profile:

receiving vertical curve information for a current short epoch:

determining a short-term acceleration target for the current short epoch based on the long-term velocity target and long-term acceleration target, and the vertical curve information; and controlling a vehicle acceleration based on a combination of the short-term acceleration target and the long-term acceleration target.

20. The method of claim 19, further comprising adjusting the long-term acceleration target by a first jerk constraint, wherein the first jerk constraint is selected from values between a 40th and 60th percentile of a set of driver values.

21. The method of claim 19, further comprising adjusting the short-term acceleration target by a second jerk constraint, wherein the second jerk constraint is selected from values between a 70th and 90th percentile of a set of driver values.

* * * * *